(12) United States Patent
Pocard et al.

(10) Patent No.: US 12,154,147 B2
(45) Date of Patent: Nov. 26, 2024

(54) SYSTEM AND METHOD FOR MATCHING CUSTOMERS WITH HAIR STYLIST BASED ON HOLISTIC CRITERIA

(71) Applicant: L'Oreal, Paris (FR)

(72) Inventors: Thomas Pocard, Chevilly Larue (FR); Lucien Bildstein, Saint-Ouen (FR); Thibaut Quelquejay, Clichy (FR); Yann Waye Keuong, Saint-Ouen (FR); Jennifer Servant, Chevilly-Larue (FR); Julien Blanchard, Clichy (FR); Maud Pasquier, Saint-Ouen (FR)

(73) Assignee: L'Oreal, Paris (FR)

(*) Notice: Subject to any disclaimer, the term of this patent is extended or adjusted under 35 U.S.C. 154(b) by 0 days.

(21) Appl. No.: 18/475,048

(22) Filed: Sep. 26, 2023

(65) Prior Publication Data

US 2024/0013265 A1 Jan. 11, 2024

Related U.S. Application Data

(63) Continuation of application No. 17/348,321, filed on Jun. 15, 2021, now abandoned.

(30) Foreign Application Priority Data

Jun. 16, 2020 (EP) .................................... 20180318

(51) Int. Cl.
*G06Q 30/0282* (2023.01)
*G06F 16/242* (2019.01)
(Continued)

(52) U.S. Cl.
CPC ..... *G06Q 30/0282* (2013.01); *G06F 16/2428* (2019.01); *G06F 16/24575* (2019.01); *G06F 16/337* (2019.01); *G06Q 50/01* (2013.01)

(58) Field of Classification Search
CPC ............... G06Q 30/0282; G06Q 50/01; G06Q 30/0631; G06Q 30/08; G06Q 50/10;
(Continued)

(56) References Cited

U.S. PATENT DOCUMENTS 6,982,962 B1 1/2006 Lunsford
8,566,327 B2 10/2013 Carrico et al.
(Continued)

OTHER PUBLICATIONS

Chignon et coiffure, T reatwell, <https://www.treatwell.fr/salons/soin-chignon-et-coiffure/offre-type-local/dans-paris-ranee> [retrieved Jun. 15, 2021). (Brief English description provided on p. 8 of the application.).
(Continued)

*Primary Examiner* — Florian M Zeender
*Assistant Examiner* — Karma A El-Chanti
(74) *Attorney, Agent, or Firm* — Christensen O'Connor Johnson Kindness PLLC

(57) ABSTRACT

A computer-implemented method of matching a customer with a service provider, the method comprising: creating, by a computing device, a profile of a customer having a plurality of categorical values descriptive of or liked by the customer; creating, by the computing device, a profile of a service provider having a plurality of categorical values descriptive of or liked by the service provider; creating, by the computing device, a request by the customer to recommend a service provider, wherein the request includes one or more requested categorical and discrete values; and providing, by the computing device, ranked recommendations of service providers to the customer based on a comparison of the categorical values in the profiles of the customer and the service provider and the requested categorical and discrete values by the customer. A service provider can be a hair stylist.

8 Claims, 23 Drawing Sheets

(51) Int. Cl.
  *G06F 16/2457* (2019.01)
  *G06F 16/335* (2019.01)
  *G06Q 50/00* (2024.01)
(58) Field of Classification Search
  CPC ............ G06Q 30/0201; G06F 16/2428; G06F 16/24575; G06F 16/337
  See application file for complete search history.

(56) References Cited

U.S. PATENT DOCUMENTS

| | | | |
|---|---|---|---|
| 9,342,577 B2* | 5/2016 | Nemery De Bellevaux | G06F 16/904 |
| 10,949,904 B2* | 3/2021 | Dotterer | G06Q 30/0609 |
| 2009/0164464 A1 | 6/2009 | Carrico et al. | |
| 2010/0145801 A1 | 6/2010 | Chekuri | |
| 2014/0136262 A1 | 5/2014 | Uzzaman | |
| 2014/0172893 A1* | 6/2014 | Carter | G06F 16/35 707/758 |
| 2014/0249920 A1 | 9/2014 | Kerr | |
| 2014/0351092 A1 | 11/2014 | Burkhart | |
| 2015/0052008 A1* | 2/2015 | Campbell | G06Q 50/01 705/26.8 |
| 2016/0048807 A1 | 2/2016 | Kreuter | |
| 2016/0063116 A1 | 3/2016 | Abuelsaad | |
| 2016/0267403 A1 | 9/2016 | Hoffart | |
| 2017/0046634 A1 | 2/2017 | Terzian | |
| 2018/0101894 A1 | 4/2018 | Markoff | |
| 2018/0211308 A1 | 7/2018 | Cheeks | |
| 2019/0095871 A1* | 3/2019 | Abney | G06Q 30/0621 |
| 2019/0392496 A1 | 12/2019 | Joyce-Brady | |
| 2021/0103939 A1 | 4/2021 | McLean | |
| 2021/0241397 A1 | 8/2021 | Norelius | |
| 2021/0248700 A1* | 8/2021 | Kelton | G06Q 30/0201 |
| 2021/0342370 A1* | 11/2021 | Caprini | G06F 16/288 |
| 2021/0357591 A1* | 11/2021 | Campos Ortega | G06F 40/289 |
| 2021/0366020 A1* | 11/2021 | Raju | G06Q 30/0631 |

OTHER PUBLICATIONS

Decouvrez et reserve le salon qui vois correspond, Kiute ex LeCiseau, <https://www.kiute.fr/> [retrieved Jun. 15, 2021]. (Brief English description provided on p. 8 of the application.).

* cited by examiner

SYSTEM AND METHOD FOR MATCHING CUSTOMERS WITH HAIR STYLIST BASED ON HOLISTIC CRITERIA

CROSS-REFERENCE TO RELATED APPLICATIONS

This application is a continuation of U.S. application Ser. No. 17/348,321, filed on Jun. 15, 2021, which claims priority to EP application no. 20180318.6, filed on Jun. 16, 2020. Both applications are expressly incorporated herein by reference for all purposes.

SUMMARY

In one embodiment, a computer-implemented method of matching a customer with a service provider, the method comprising: creating, by a computing device, a profile of a customer having a plurality of categorical values descriptive of or liked by the customer; creating, by the computing device, a profile of a service provider having a plurality of categorical values descriptive of or liked by the service provider; creating, by the computing device, a request by the customer to recommend a service provider, wherein the request includes one or more requested categorical and discrete values; and providing, by the computing device, ranked recommendations of service providers to the customer based on a comparison of the categorical values in the profiles of the customer and the service provider and the requested categorical and discrete values by the customer.

In one embodiment, the service provider is a hair stylist.

In one embodiment, the computer-implemented method further comprises, creating, by the computing device, a salon page having a plurality of discrete values and categorical values descriptive of a salon of the hair stylist.

In one embodiment, the recommendations are further based on determining location coordinates of the customer via a global positioning system or a manual location entry and calculating the distance to a hair stylist is within the requested discrete value of maximum distance to travel by the customer.

In one embodiment, the categorical values in the profile of the customer are selected from one or more of the group consisting of sex, hair length, favorite book genre, favorite music genre, favorite television series, favorite sport participant, favorite discussion topic, first favorite brand, second favorite brand, third favorite brand, or a combination thereof.

In one embodiment, the customer has the option to not specify a categorical value.

In one embodiment, the categorical values of the customer are provided through a questionnaire, or are extracted from social media or user-generated content by means of artificial intelligence, or image analysis, or analysis of hashtags found on social media, or a combination.

In one embodiment, the categorical values of the hair stylist are provided through a questionnaire, or are extracted from social media or user-generated content by means of artificial intelligence, or image analysis, or analysis of hashtags found on social media, or a combination.

In one embodiment, the categorical values of the hair stylist are extracted from image analysis of the hair stylist's salon page.

In one embodiment, the categorical values in the profile of the hair stylist are selected from one or more of the group consisting of sex of customer, favorite book genre, favorite music genre, favorite television series, favorite discussion topic, favorite sport participant, salon location, first hair styling skill, second hair styling skill, third hair styling skill, fourth hair styling skill, fifth hair styling skill, sixth hair styling skill, location type, first favorite brand, second favorite brand, third favorite brand, fourth favorite brand, fifth favorite brand, sixth favorite brand, or a combination thereof.

In one embodiment, the hair stylist has the option to not specify a categorical value.

In one embodiment, the requested categorical values are selected from hair styling services and customer location, and the requested discrete values are selected from maximum distance to travel, importance of hair styling skill of the hair stylist, importance of customer profile, importance of customer favorite brands.

In one embodiment, the importance of the hair styling skill of the hair stylist, importance of customer profile, and importance of customer favorite brands are selected from values of low, medium, and high.

In one embodiment, the computer-implemented method further comprises providing feedback by a customer ranking the hair styling skills of the hair stylist to the requested hair styling service and ranking one or more of the categorical values in the profile of the hair stylist.

In one embodiment, the recommendations are given as a percent representing a closeness of a match of the customer profile with the hair stylist profile and a match of the requested categorical and discrete values to the hair stylist profile.

In one embodiment, a computing device, comprising at least a memory and processor, is configured to: create a profile of a customer having a plurality of categorical values descriptive of or liked by the customer; create a profile of a service provider having a plurality of categorical values descriptive of or liked by the service provider; create a request by the customer to recommend a service provider, wherein the request includes one or more requested categorical and discrete values; and provide ranked recommendations of service providers to the customer based on a comparison of the categorical values in the profiles of the customer and the service provider and the requested categorical and discrete values by the customer.

In one embodiment, the service provider is a hair stylist.

In one embodiment, the computing device is further configured to create a salon page having a plurality of discrete values and categorical values descriptive of a salon of the hair stylist.

In one embodiment, the recommendations are further based on determining location coordinates of the customer via a global positioning system or a manual location entry and calculating the distance to a hair stylist is within the requested discrete value of maximum distance to travel by the customer.

In one embodiment, the categorical values in the profile of the customer are selected from one or more of the group consisting of sex, hair length, favorite book genre, favorite music genre, favorite television series, favorite sport participant, favorite discussion topic, first favorite brand, second favorite brand, third favorite brand, or a combination thereof.

In one embodiment, the customer has the option to not specify a categorical value.

In one embodiment, the categorical values of the customer are provided through a questionnaire, or are extracted from social media or user-generated content by means of artificial intelligence, or image analysis, or analysis of hashtags found on social media, or a combination.

In one embodiment, the categorical values of the hair stylist are provided through a questionnaire, or are extracted from social media or user-generated content by means of artificial intelligence, or image analysis, or analysis of hashtags found on social media, or a combination.

In one embodiment, the categorical values of the hair stylist are extracted from image analysis of the hair stylist's salon page.

In one embodiment, the categorical values in the profile of the hair stylist are selected from one or more of the group consisting of sex of customer, favorite book genre, favorite music genre, favorite television series, favorite discussion topic, favorite sport participant, salon location, first hair styling skill, second hair styling skill, third hair styling skill, fourth hair styling skill, fifth hair styling skill, sixth hair styling skill, location type, first favorite brand, second favorite brand, third favorite brand, fourth favorite brand, fifth favorite brand, sixth favorite brand, or a combination thereof.

In one embodiment, wherein the hair stylist has the option to not specify a categorical value.

In one embodiment, the requested categorical values are selected from hair styling services and customer location, and the requested discrete values are selected from maximum distance to travel, importance of hair styling skill of the hair stylist, importance of customer profile, importance of customer favorite brands.

In one embodiment, the importance of the hair styling skill of the hair stylist, importance of customer profile, and importance of customer favorite brands are selected from values of low, medium, and high.

In one embodiment, the computing device is further configured to provide feedback by a customer ranking the hair styling skills of the hair stylist to the requested hair styling service and ranking one or more of the categorical values in the profile of the hair stylist.

In one embodiment, the recommendations are given as a percent representing a closeness of a match of the customer profile with the hair stylist profile and a match of the requested categorical and discrete values to the hair stylist profile.

In one embodiment, a system comprises: a profile building engine including computational circuitry configured to: create a profile of a customer having a plurality of categorical values descriptive of or liked by the customer and to create a profile of a service provider having a plurality of categorical values descriptive of or liked by the service provider; a request building engine including computational circuitry configured to: create a request by the customer to recommend a service provider, wherein the request includes one or more requested categorical and discrete values; and a matching engine including computational circuitry configured to: provide ranked recommendations of service providers to the customer based on a comparison of the categorical values in the profiles of the customer and the service provider and the requested categorical and discrete values by the customer.

In one embodiment, the service provider is a hair stylist.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
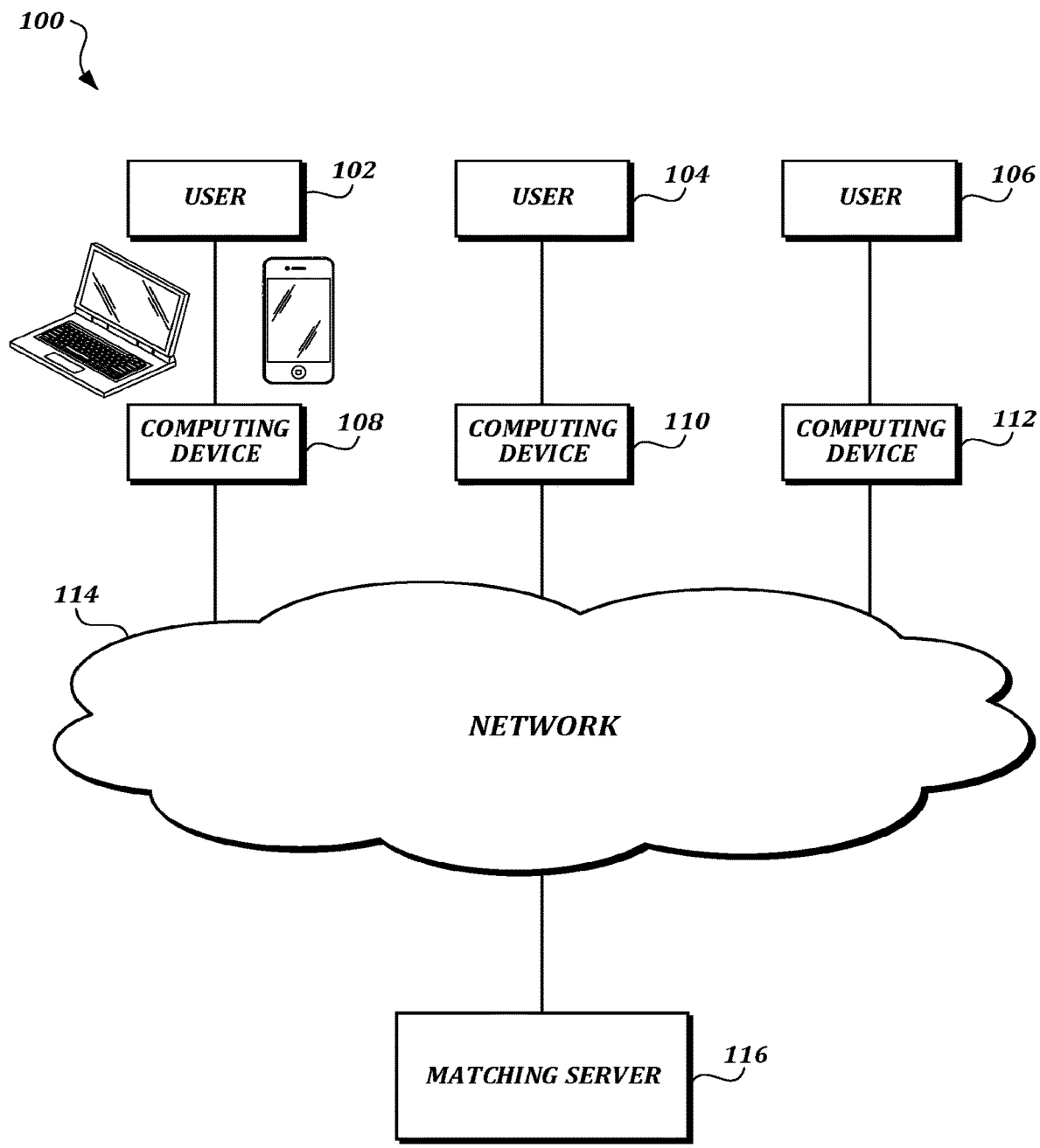
FIG. 1 is a schematic diagram that illustrates an embodiment of a system for generating and providing hair stylist recommendations to a customer according to the present disclosure.

The selection of any service provider, for example a hair stylist, can involve searching online for reviews, or selection of a service provider can also involve talking with friends and relatives to get recommendations. U.S. Pat. No. 8,566, 327B2 describes a method for matching user profiles based on preferences indicated by users. Finding a hair styling salon according to user preferences is described in the website: https://www.treatwell.fr/salons/soin-chignon-et-coiffure/offre-type-local/dans-paris-france. Websites are also available to make reservations, such as the website: https://www.leciseau.fr. Many websites and apps already exist but focus only on pricing aspects or on market segmentation to provide traffic to specific service providers. They play on special offers, discount prices or even on special cooptation for more luxury positioned brands. Customer loyalty and value aren't taken into consideration in the state of the art offers. The selection method using these resources, at best, gives no assurances that the chosen service provider (e.g., hair stylist) will be compatible with a customer, not only in terms of meeting a customer's expectation for providing high quality services, but, also that the personality of a service provider is compatible with a customer's, as customers can spend many hours in the presence of a service provider. Therefore, it becomes important that the customer can relax and enjoy the experience.

Accordingly, there is a need for selecting a service provider, such as a hair stylist or any other hair care professional for an individual having distinct preferences. Although the description and figures make reference to a hair stylist, this is done to merely illustrate on representative embodiment. This disclosure is not limited to hair stylists, and the methods disclosed herein may be used for recommending any service provider to a customer.

As a consequence of the methods for matching a customer with a service provider in accordance with this disclosure, the service provider saves time, finds his customers more easily and uses his skills better. The customer also saves time finding a qualified and compatible service provider. The customer is more confident because he will find a service provider with a desired expertise, and has less stress when he goes to the service provider because he can be sure he has found the expert on his problem.

In accordance with this disclosure, a service provider is recommended having the right expertise. There is trust on the part of the consumer having found the right service provider for the right problem. On the other side, the service provider is also more confident because he is sure he will use his own and specific skills. He won't be asked by the customer to use skills he doesn't master. For example, some hair stylists are good at coloration but might have poor abilities for cutting hair. Consequently, the hair stylist will be also more confident. Thus, the match is a win-win relation between the hair stylist and the customer.

FIG. 1 is a schematic diagram that illustrates a non-limiting example embodiment of a system 100 for generating and providing recommendations for a service provider, such as hair stylist, to a user-customer according to various aspects of the present disclosure. In the system 100, each of a plurality of users 102, 104, and 106 with a respective computing device 108, 110, and 112 can use the system 100. A computing device 108, 110, 112 can include terminals and mobile devices.

In this disclosure, a "user" can be a user-hair stylist or user-customer. The user-customer can be a prospective customer in the sense that the user-customer is searching for a hair stylist. Hair stylist is a broad term encompassing any service provider of hair care services, such as, cutting hair, styling hair, coloring hair, bleaching hair, hair extensions, and the like.

As shown, the terminals or mobile computing devices 108, 110, and 112 and the matching server 116 may communicate via a network 114. The network 114 may include any suitable networking technology, including but not limited to a wireless communication technology (including but not limited to Wi-Fi, WiMAX, Bluetooth, 2G, 3G, 4G, 5G, and LTE), a wired communication technology (including but not limited to Ethernet, USB, and FireWire), or combinations thereof.

Figure 2:
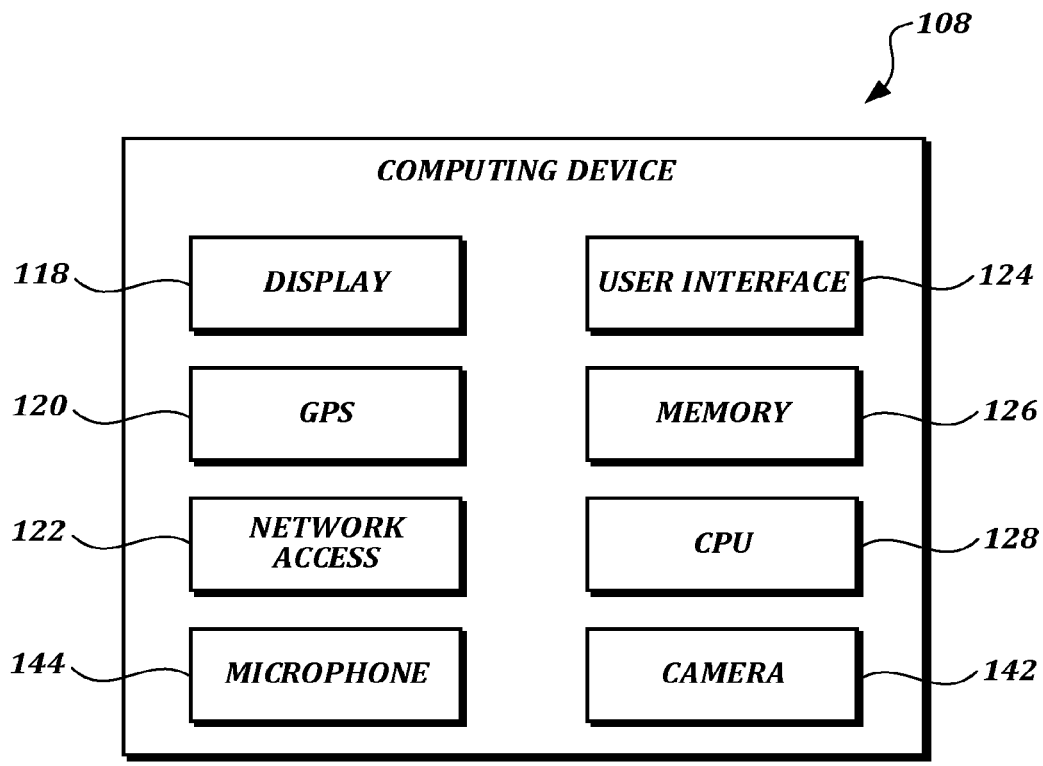
FIG. 2 is a block diagram that illustrates an embodiment of a terminal or mobile computing device according to the present disclosure.

FIG. 2 is a block diagram that illustrates a non-limiting example embodiment of a terminal or mobile computing device, such as 108, for use by a user-customer or a user-hair stylist.

In some embodiments, the mobile computing device 108 may be a smartphone. In some embodiments, the mobile computing device 108 may be any other type of computing device having the illustrated components, including but not limited to a tablet computing device or a laptop computing device. In some embodiments, the mobile computing device 108 may not be mobile, but may instead by a stationary computing device such as a desktop computing device. In some embodiments, the illustrated components of the mobile computing device 108 may be within a single housing. In some embodiments, the illustrated components of the mobile computing device 108 may be in separate housings that are communicatively coupled through wired or wireless connections (such as a laptop computing device with an external global positioning system receiver). The mobile computing device 108 also includes other components that are not illustrated, including but not limited to one or more processors, a non-transitory computer-readable medium, a power source, and one or more communication interfaces.

As shown, the mobile computing device 108 includes a display 118, a global positioning system receiver 120, network access 122, user interface 124 (touchscreen, keys, etc.), system memory 126, a microphone 144, a camera 142, and a central processing unit (CPU) 128.

In some embodiments, the display 118 is an LED display, an OLED display, or another type of display for presenting a user interface. In some embodiments, the display 118 may be combined with or include a touch-sensitive layer, such that a user 102, 104, and 106 may interact with a user interface presented on the display 118 by touching the display. In some embodiments, a separate user interface device, including but not limited to a mouse, a keyboard, or a stylus, may be used to interact with a user interface presented on the display 118.

In some embodiments, the microphone 144 allows a user to use voice controls for interfacing with the computing device 108. In some embodiments, the computing device 108 is configured for control through gestures, such as swiping. In some embodiments, the microphone 144 and camera 142 provide the ability for sound recording and photo/video acquisition.

Figure 3:
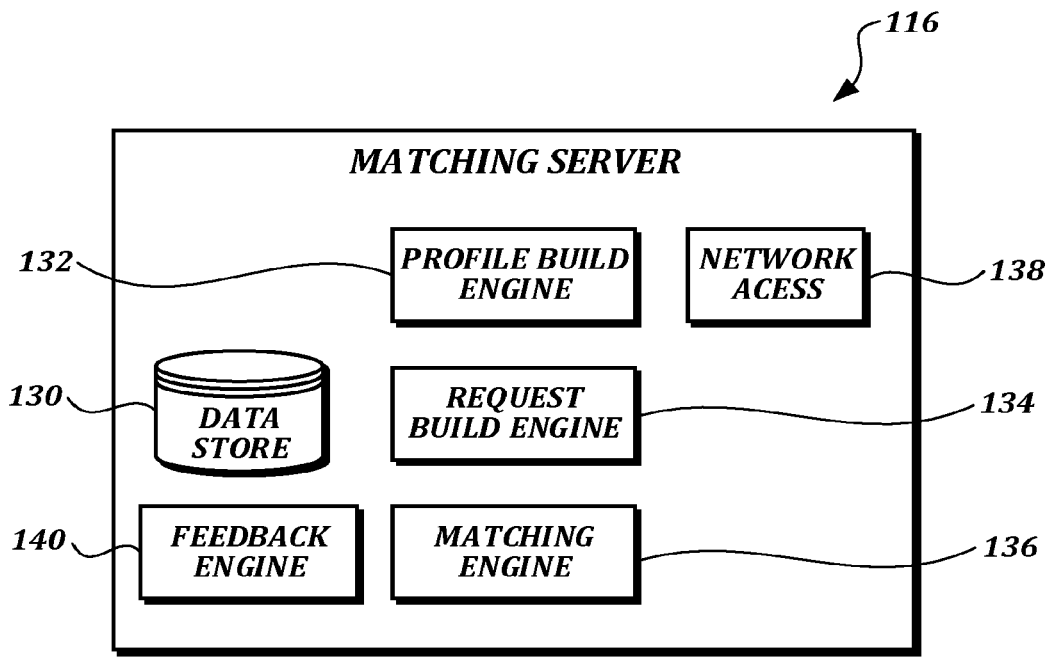
FIG. 3 is a block diagram that illustrates an embodiment of a server computing device according to the present disclosure.

Referring to FIG. 3, a matching server 116 in accordance with one embodiment of this disclosure is illustrated. In some embodiments, the matching server includes a profile build engine 132, a request build engine 134, a matching engine 136, a feedback engine 140, data store 130, and network access 138. Further, the matching server 116 includes one or more computing devices that each include one or more processors, non-transitory computer-readable media, and network communication interfaces that are collectively configured to provide the illustrated components. In some embodiments, the one or more computing devices that make up the matching server 116 may be rack-mount computing devices, desktop computing devices, or computing devices of a cloud computing service.

In some embodiments, the profile build engine 132 can be transmitted to the mobile device 108, free or for a nominal user fee, and then the profile build engine is stored in the system memory 126 of the mobile device 108. The profile build engine can be an "App" that is launched by a user clicking an icon on the display 118 of the mobile device 108. In another embodiment, the profile build engine 132 is launched in the mobile device 108 through communication over the network 114, such as by going to a link on website. The profile build engine 132 can present the user with webpages on the mobile device 108.

In some embodiments, a user-customer profile built by the profile build engine 132 includes image analysis, for example, analysis of a user-customer pictures or analysis of a user-customer's social media accounts, including analysis of "hashtags" in the social media accounts as a source of personality traits. The image and text analysis can be performed by respective image and text processors operating artificial intelligence (AI) routines to extract personality data from existing user-generated information instead of using a questionnaire.

In some embodiments, the data store 130 is configured to store profiles for each user 102, 104, and 106. The profiles include categorical values and discrete values for each one of the users 102, 104, and 106.

In some embodiment, the profile build engine 132 is configured to obtain certain categorical and discrete values from each user 102, 104, and 106 depending on whether the user is a user-customer or user-hair stylist. The categorical and discrete values are descriptive of the user or things the user likes or that can describe the user's personality, for example, a profile for a user-customer may include the categorical values of: name, gender, address, favorite book genre, favorite music genre, favorite TV series, favorite discussion subject, favorite sport participant, favorite brands, and hair length, for example to describe the user-customer and something about their personalities. A hair stylist profile may include the categorical values of: name, gender serviced, hair styling skills, favorite book genre, favorite music genre, favorite TV series, favorite discussion subject, favorite sport participant, favorite brands used, and work location, for example, to describe the user-hair stylist and something about their personalities or hair styling qualifications. The values for all of these categories may be entered by the user-customer and user-hair stylist through the display 118 on the mobile device 108.

In some embodiments, a hair stylist profile built by the profile build engine 132 includes image analysis, for example, analysis of a hair stylist's salon pictures or analysis of a hair stylist's social media accounts, including analysis of "hashtags" in the social media accounts as a source of personality traits. The image and text analysis can be performed by respective image and text processors operating artificial intelligence (AI) routines to extract personality data from existing user-generated information instead of using a questionnaire.

In some embodiments, the request build engine 134 is configured to receive certain categorical values and discrete values from the user-customer. The request values are used in combination with the profiles to recommend a user-hair stylist to the user-customer. For example, a request build engine 134 can obtain user-customer categorical values of: present location, maximum distance willing to travel, hair styling service needed, preferred salon ambiance, the subjective importance to the user-customer of certain of the hair stylist's criteria, such as the hair stylist's hair styling skills, the hair stylist's personality, and the hair stylist's favorite brands. The values for all of these categories may be entered by the user-customer through the display 118 on the mobile device 108 to fill out the request or through analysis of the user-generated content, such as from social media. The values in the request filled out by the user-customer or through analysis of the social media accounts, along with the user-customer's profile is compared to user-hair stylists' profiles stored in the system 100 to provide ranked recommendations of user-hair stylists.

In some embodiments, a user-customer profile built by the profile build engine 132 includes image analysis, for example, analysis of a user-customer's pictures in social media accounts and/or analysis of a user-customer's social media accounts, including analysis of "hashtags" in the social media accounts as a source of personality traits. The image and text analysis can be performed by respective image and text processors operating artificial intelligence (AI) routines to extract personality data from existing user-generated information instead of using a questionnaire.

In some embodiments, the matching engine 136 is configured to compare the requested categorical and discrete values to the profiles of the user-hair stylists in the system 100. As described above, the categorical values and discrete values can be input directly by a user through a questionnaire and/or indirectly through AI image and text processors analyzing user-generated content on the user's social media. In some embodiments, the matching engine 136 can use the present location, as determined by a global positioning system receiver, of the user-customer to narrow the list of possible recommendations of hair stylists within the requested geographical area. Thus, a user-customer will be able to find a hair stylist even when traveling abroad.

In some embodiments, the request build engine 134 is configured to receive certain categorical values and discrete values when the user-hair stylist has selected the job searching feature. A feature for user-hairstylist profiles and salon pages is the ability to indicate whether there is employment available, in which case, the employer user-hair stylist or salon and input job description and qualifications. The request values input by a job searching user-hair stylist and their profiles are matched with the job description and job qualifications provided by employer user-hair stylists and salons, so that the matching engine 136 will recommend employer user-hair stylists and salons to another user-hair stylist searching for a job. For example, the request build engine 134 can obtain user-hair stylist categorical and discrete values relevant for matching job searchers with employers. For example, a job search request discrete value may include a maximum distance the job searching user-hair stylist is willing to travel. Job search request categorical values may include, for example, the hair styling skills in which the job searching user-hair stylist is proficient, the preferred salon ambiance, favorite product brands, and the values relevant to personality. The job searching user-hair stylist may also assign the subjective importance of matching one categorical value more than another. For example, a job searching user hair stylist may assign higher importance to matching personality rather than skill, salon ambiance, or favorite product brands. The values for all of these discrete and categorical values may be entered by the job searching user-hair stylist through a series of GUI screens on the display 118 or through AI machine learning analysis of the user-generated content, such as from social media. The values in the request filled out by the job searching user-hair stylist or through analysis of the social media accounts, along with the job searching user-hair stylist's profile is compared to employer user-hair stylists' profiles and salon pages stored in the system 100 to provide ranked recommendations of employer user-hair stylists and salons.

In some embodiments, the matching engine 136 is configured to compare the requested categorical and discrete values to the profiles of the employer user-hair stylists in the system 100. As described above, the categorical values and discrete values can be input directly by a user through a questionnaire and/or indirectly through AI image and text processors analyzing user-generated content on the user's social media. In some embodiments, the matching engine 136 can use the present location, as determined by a global positioning system receiver, of the user-customer to narrow the list of possible recommendations of employer hair stylists within the requested geographical area.

Further, in comparing the requested hair styling service needed by the user-customer, personality, and favorite brand and possibly preferences derived from AI-based personality matching of the user-customer profile to the user-hair stylist profile, the matching engine 136 applies the weighted subjective importance to the user-customer of the hair stylist's hair styling skills, the hair stylist's personality, and the hair stylist's favorite brands. The matching engine 136 then sends the ranked recommendations to the user-customer, which the user-customer can then click on to find out more about the hair stylist, call, or email further questions, or ask to make an appointment, etc. In addition, the user-customer can also view results of feedback provided by other user-customers. Once the user-customer has used the services of a user-hair stylist, the user-customer may also provide feedback.

In some embodiments, the feedback engine 140 is configured to receive input from a user-customer regarding whether the categorical values relating to hair stylist's skills in the profile of a hair stylist are accurate. For example, if a hair stylist's profile indicates that the hair stylist is skilled at cutting, then, a user-customer who received a hair cut from the hair stylist can provide feedback by either agreeing or not agreeing that the hair stylist was proficient in the hair cutting skill. Further, the feedback engine 140 can be configured to receive input whether the categorical values in the profile of a hair stylist relating to hair stylist's personality are accurate. For example, if the hair stylist's profile indicates that the hair stylist's favorite music genre is rock n roll, but, the hair stylist only talked about jazz and blues music, then, the user-customer can disagree that the user-hair stylist's favorite music genre is rock n roll.

In this disclosure, "engine" of components 132, 134, 136, and 140 refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, and/or the like. Examples of AI machine learning routines include, but are not limited to, convolutional neural networks and image segmentation. Deep learning programming languages include, for example, TENSORFLOW™, PYTORCH™, SONNET™, KERAS™, MXNet™, GLUON™, SWIFT™, CHAINER™, DL4J™, and ONNX™. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

The "data store" 130 refers to any suitable device configured to store data for access by a computing device. One example of a data store 130 is a highly reliable, high-speed relational database management system (DBMS) executing on one or more computing devices and accessible over a high-speed network. Another example of a data store 130 is a key-value store. However, any other suitable storage technique and/or device capable of quickly and reliably providing the stored data in response to queries may be used, and the computing device may be accessible locally instead of over a network, or may be provided as a cloud-based service.

A data store 130 may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

The computing device 108, 110, and 112 is used to complete a unique profile for each of the users 102, 104, and 106. The data in the profile is prompted by the profile build engine 132 by using a series of graphical user interfaces, for example. Additionally or alternatively, the user profile is also built by AI routines that analyze user-generated content, such as found in social media including, for example, images, text, and hashtags. The profile contains categorical values and discrete values that describe certain preferences, likes, and attributes unique to the individual user 102, 104, and 106. Categorical values have ranges defining members of the category. Members of a favorite music genre and favorite book genre would be categorical values. Some categorical values are ordinal, meaning that values in the category have a natural order, such as small, medium, large, for example. Discrete values can usually be counted, are integers or real numbers. A collection of categorical and discrete values can be used to describe the personality of a user, their location, skill, preferences, likes, dislikes, etc.

The computing device 108, 110, 112, includes the profile build engine that presents a series of graphical user interfaces that allow the user to specify, or optionally not specify, the categorical and discrete values of his/her profile, or use AI routines that link to social media to extract the features to use in the profile. Some categorical and discrete values will be different depending on whether the user 102, 104, and 106 is a user-hair stylist or user-customer.

Once completed, the profiles are transmitted to the matching server 116, where they are stored in the data store 130. Once in the system 100, user-customers and user-hair stylists can use the system 100. The matching server 116 waits for a request from a user-customer or user-hair stylist to act upon the request to provide ranked recommendations of a user-hair stylist to the user-customer or provide ranked recommendations of an employer user-hair stylists to job searching user-hair stylists. In one embodiment, only user-hair stylists that are in the system 100 are recommended to the user-customer or job searching user-hair stylists. A real-time request from a user-customer or user-hair stylist may further contain additional categorical and discrete values that are not already in the user-customer profile, and may be unique to the present request of the user-customer and user-hair stylists.

When a request from a user-customer or job searching user-hair stylist is received at the matching server 116, the matching server 116 may execute a matching engine that compares the profile of the user-customer or job searching user-hair stylist who sent the request along with the additional requested categorical and discrete values to the profiles of the user-hair stylists. The comparison by the matching server 116 yields a ranked recommendation for user-hair stylists that most closely match with the profile of the user-customer and the values specified in the request, or in the case of job searching user-hair stylists, the matching server 116 yields a ranked recommendation for employer user-hair stylists. In one embodiment, the request may include the location and maximum distance willing to travel by the user-customer. The present location may be gathered by the computing device 108, 110, and 112, with a global positioning system receiver in the computing device 108, 110, and 112. Alternatively, if the use-customer is traveling, the user-customer may provide the current, but not home, location.

The matching server 116 may then make the first match of user-hair stylists by selecting only those within the geographical area specified in the request. The ranking according to location first can save processing time and resource, since many user-hair stylists can be eliminated based on not matching the geolocation request. The ranking of user-hair stylists, as well as other information, may be provided to the user-customer via a display on the computing device 108, 110, and 112.

Figure 4:
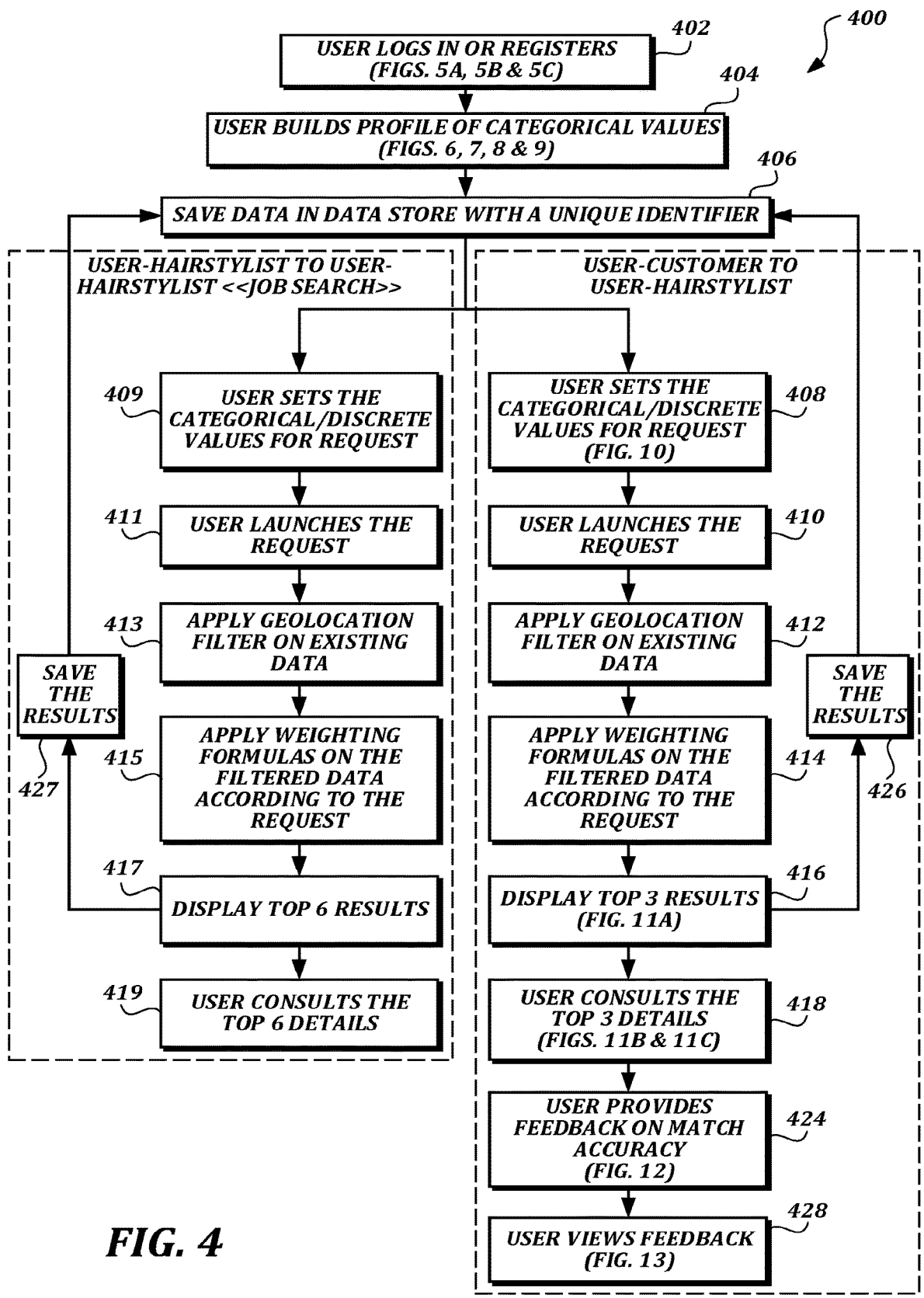
FIG. 4 is a flowchart that illustrates an embodiment of a method of generating and providing hair stylist recommendations to a customer according to the present disclosure.

FIG. 4 is a flowchart that illustrates a non-limiting example embodiment of a method 400 of completing user profiles and providing recommendations to a user-customer looking for a hair stylist based on matching a user-customer's categorical and discrete values reflective of the customer's likes, personality, locations, and services needed. The method 400 can be implemented in computer hardware or software on the computing device 108 as an application (or App) and in the matching server 116. In addition, FIG. 4 also includes a method for recommending an employer user-hair stylist to a job searching user-hair stylist.

In block 402, the method requests the user to log in if the user already has an account, or alternatively, if the user does not have an account, the user can register to set up an account.

Figure 5A:
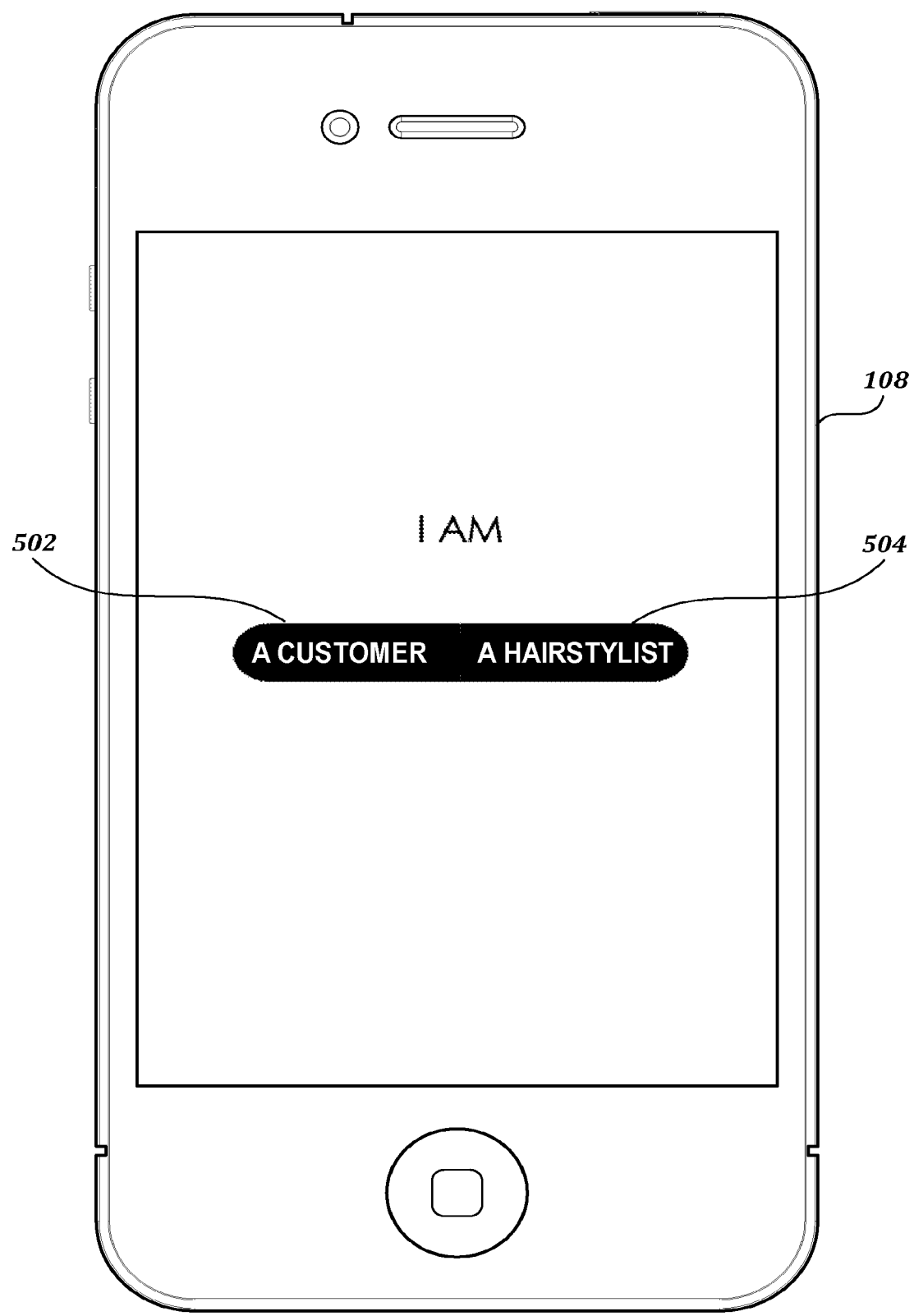
FIG. 5A is a block diagram that illustrates one embodiment of a graphical user interface (GUI) of a mobile device for performing an action of the method of FIG. 4.
Figure 5B:
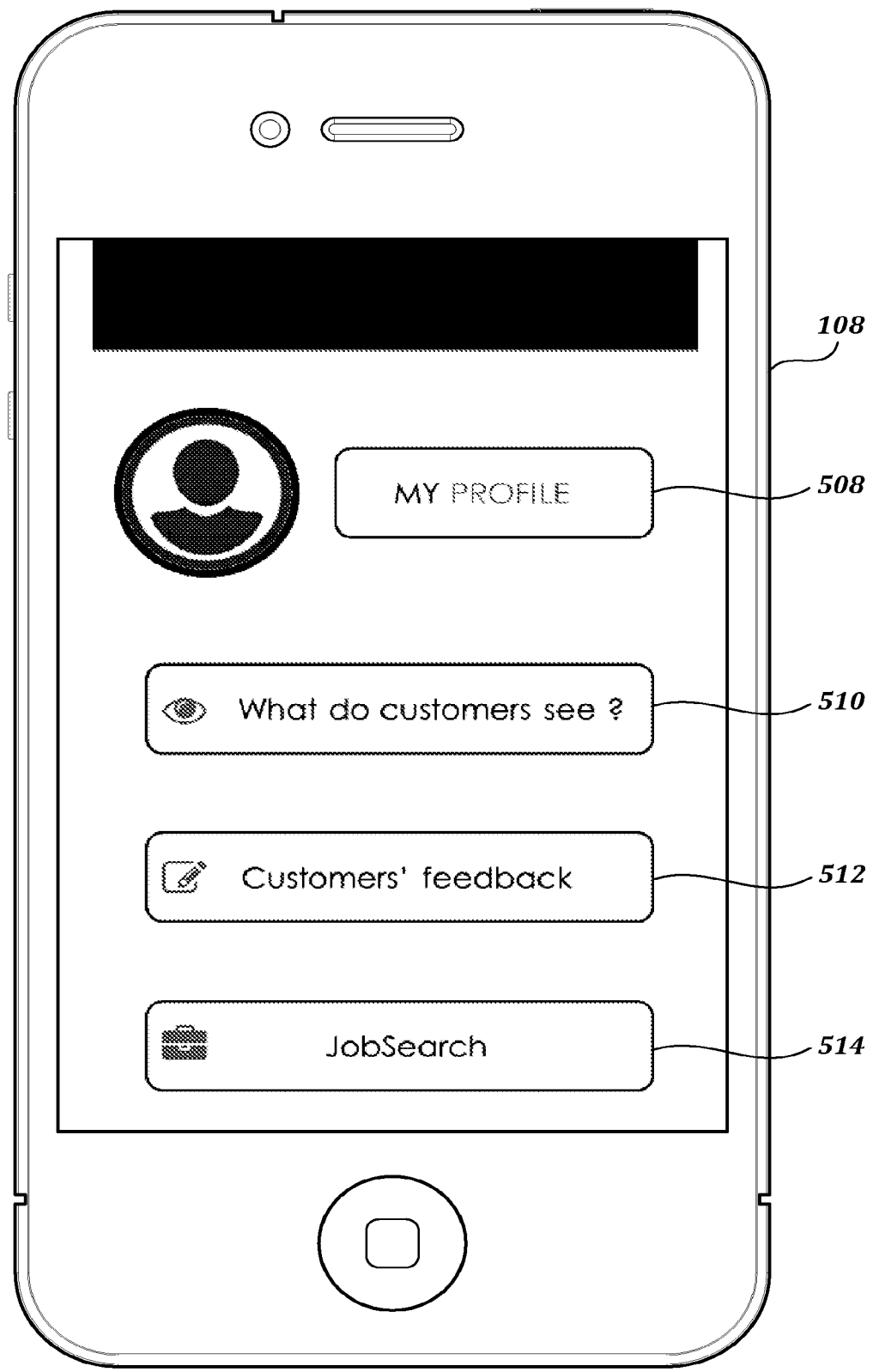
FIG. 5B is a block diagram that illustrates one embodiment of a graphical user interface (GUI) of a mobile device for performing an action of the method of FIG. 4.
Figure 5C:
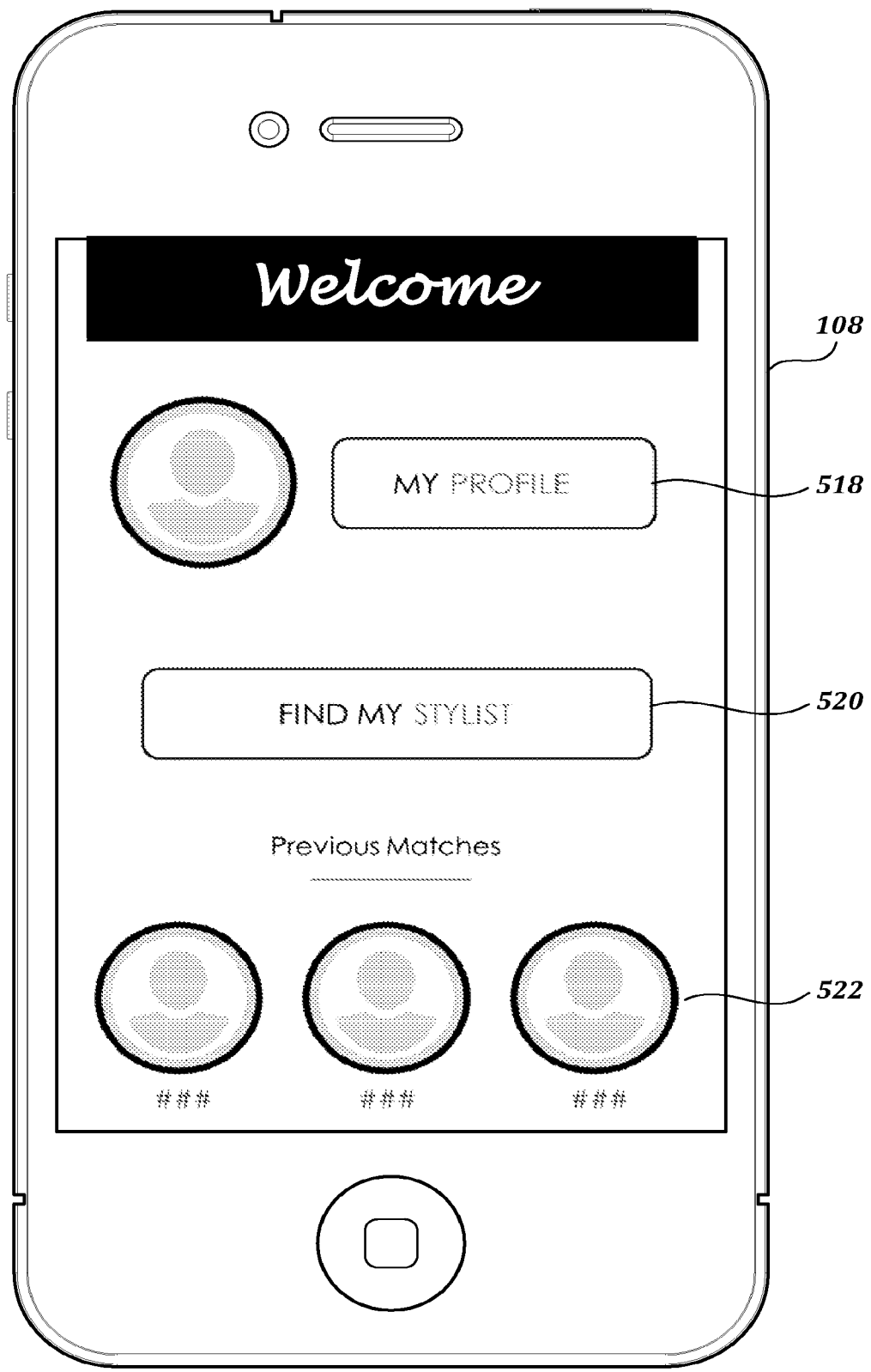
FIG. 5C is a block diagram that illustrates one embodiment of a graphical user interface (GUI) of a mobile device for performing an action of the method of FIG. 4.

FIG. 5A is one illustrative example of a GUI screen of a mobile device 108 that can be used to log in or register for first-time users. Mobile device 108 is merely to illustrate aspects of the disclosure. In FIG. 5A, the user can select the button 502 if the user is a user-customer, or the user can select the button 504 if the user is s user-hair stylist. Depending on button 502 and 504 selected, the method 400 will bring up a different screen for the user-customer and the user-hair stylist. For example, if a user selects button 504 for a user-hair stylist, then a screen as illustrated in FIG. 5B can be presented to the user-hair stylist. FIG. 5B is the home screen for a user-hair stylist and shows buttons for selecting from building/editing profile 508, viewing the hair-stylist's profile edited for public viewing 510, reviewing user-customer feedback 512, and searching for a job 514. If the user is a user-customer and selects button 502 from FIG. 5A, then a screen as illustrated in FIG. 5C can be presented to the user-customer. FIG. 5C is the home screen for a user-customer and shows buttons for selecting from building/editing profile 518, making a request 520, or selecting to view the public profiles of user-hairstylists from a field that displays previous matches 522. Field 522 may include a picture of the hair stylist and a link to the hair stylist's profile edited for public viewing. From block 402, the method enters block 404

In block 404, a first-time user will build a profile, or if the user is not a first-time user, the user can edit the profile. The method can recognize whether the user has a profile or not, and display the appropriate screen. The profile build engine 132 (FIG. 3) can generate the screens for inputting the categorical and discrete values for building and displaying the user profiles of both the user-hair stylist and the user-customer.

Figure 6:
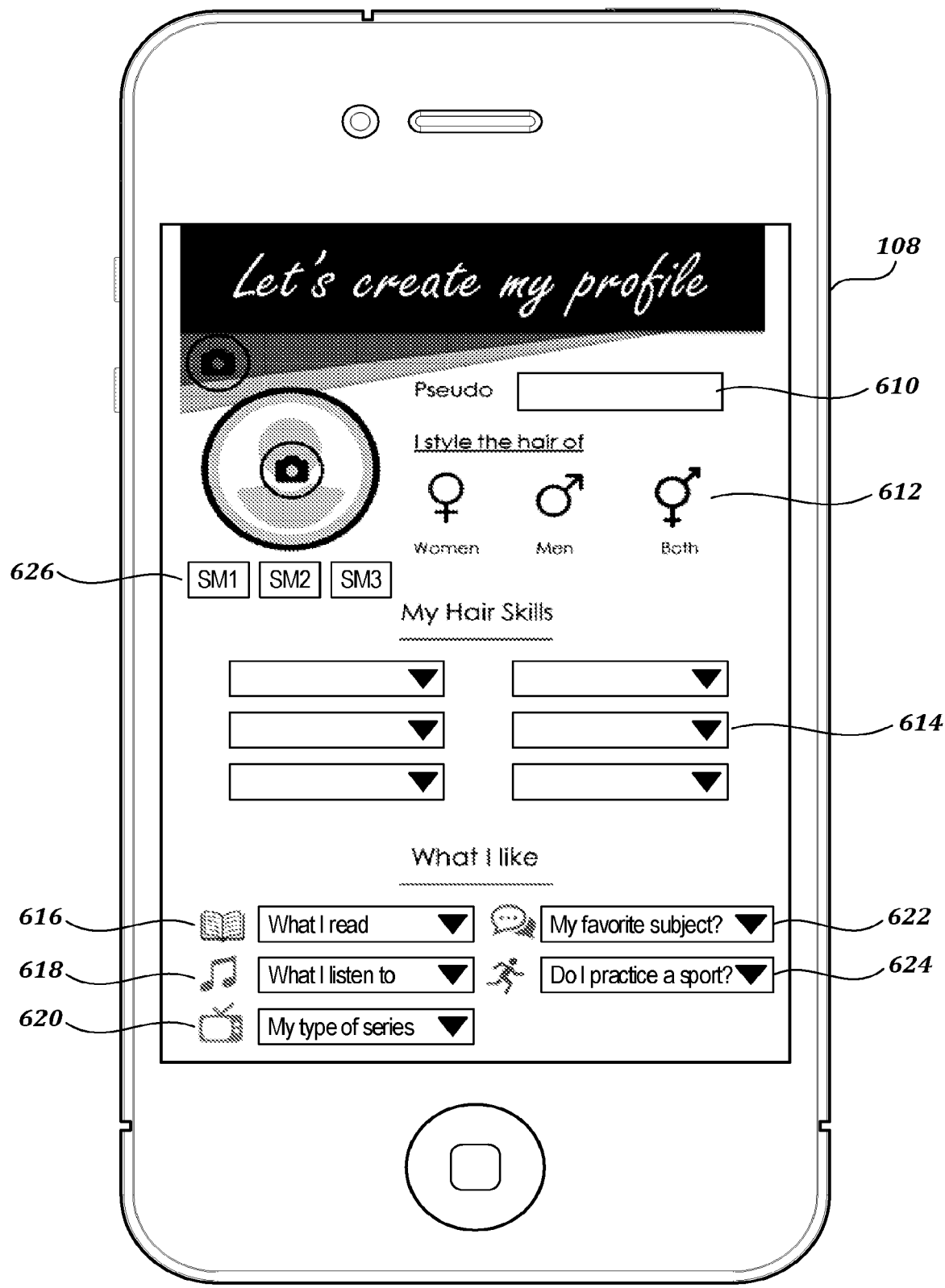
FIG. 6 is a block diagram that illustrates one embodiment of a graphical user interface (GUI) of a mobile device for performing an action of the method of FIG. 4.

FIG. 6 is one illustrative example of a GUI screen of a mobile device 108 for creating a user-hair stylist profile. Input text block 610 allows the entry of alphanumeric characters to designate a user name for identification purposes. Input field 612 includes three buttons that allows the user-hair stylist to identify the categorical value of the gender of clients serviced by the hair stylist. Input field 614 can contain any number, six, for example, of drop-down menus for identifying the categorical values of the hair stylist's hair styling skills. The skills can be ranked or non-ranked. Skills can include, but are not limited to, hair cutting, dyeing, permanent, extensions, shampooing, and the like. Input field 616 is a drop down menu for selecting the categorical value of book genres from which the hair stylist can select a favorite or not specify a favorite. Input field 616 is a descriptor for personality. Input field 618 is a drop down menu for selecting the categorical value of music genres from which the hair stylist can select a favorite or not specify a favorite. Input field 618 is a descriptor for personality. Input field 620 is a drop down menu for selecting the categorical value of TV series genres from which the hair stylist can select a favorite or not specify a favorite. Input field 620 is a descriptor for personality. Input field 622 is a drop down menu for selecting the categorical value of conversation topics from which the hair stylist can select a favorite or not specify a favorite. Input field 622 is a descriptor for personality. Input field 624 is a drop down menu for selecting the categorical value of sport participation from which the hair stylist can select a favorite or not specify a favorite. Input field 624 is a descriptor for personality.

Social media buttons 626 can be used to link to the user-hair stylist's social media accounts. When selected, the one or more of the social media accounts are analyzed for user-generated content to automatically capture personality traits using AI routines that perform text and/or image analysis.

Figure 7A:
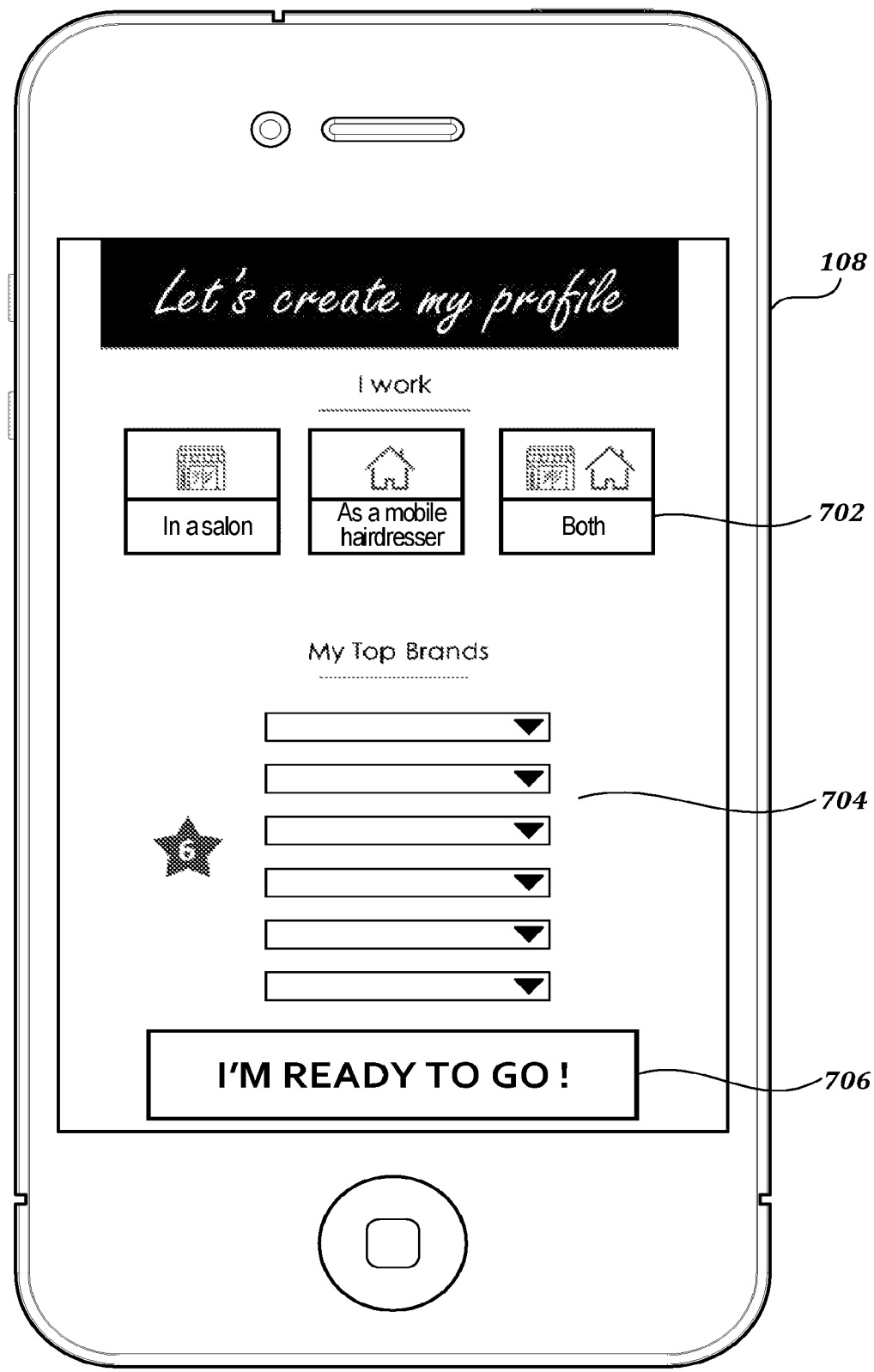
FIG. 7A is a block diagram that illustrates one embodiment of a graphical user interface (GUI) of a mobile device for performing an action of the method of FIG. 4.

FIG. 7A is one illustrative example of a GUI screen of a mobile device 108 for creating a user-hair stylist profile. Input field 702 includes three buttons that allows the user-hair stylist to identify the categorical value of the location type. Further screens may prompt the user-hair stylist to enter additional categorical values depending on the location type. For a physical salon location, further screens may require input of categorical values for the address, the number of total seatings in the salon, the salon ambiance from a drop down menu. For a mobile location, screens may require a discrete value for a maximum distance willing to travel to a customer. For both location types, input may be required of categorical values for contact information, such as phone, email, website, social medium accounts, an appointment calendar showing open times, prices for each hair styling skill, or combinations. Next, input field 704 can contain any number, six, for example, of drop-down menus for identifying the categorical values of the hair stylist's favorite product brands.

Figure 7B:
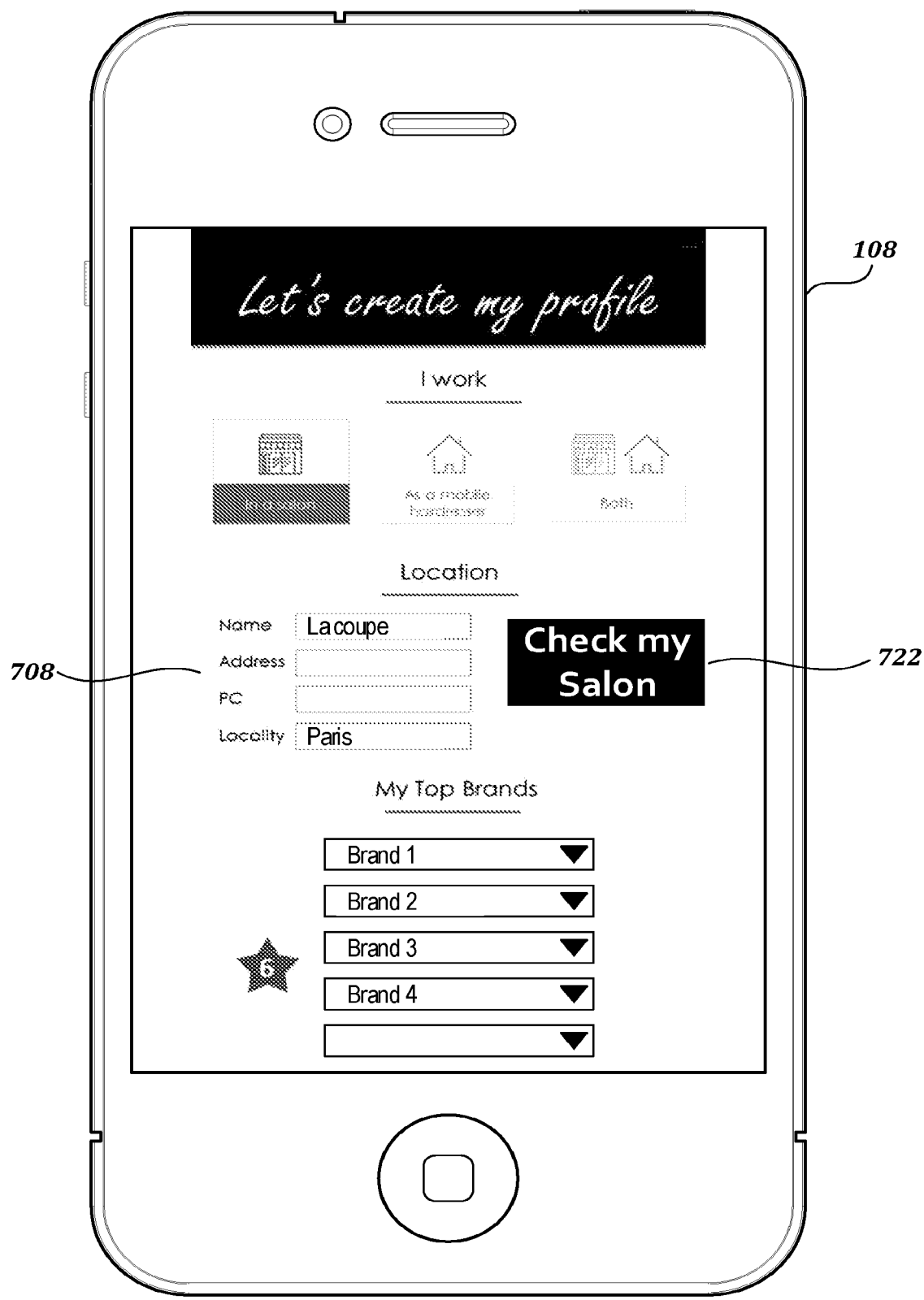
FIG. 7B is a block diagram that illustrates one embodiment of a graphical user interface (GUI) of a mobile device for performing an action of the method of FIG. 4.

FIG. 7B is one illustrative example of a GUI screen of a mobile device 108 for creating a salon page. FIG. 7B would appear if the user-hair stylist specifies a salon location in field 702 of FIG. 7A. Field 708 includes text fields for including a physical address for a salon. After entering the physical address of the salon in field 708, and then clicking on the "CHECK MY SALON" button 722, the system will check if this address already exist in the salon database. In other words, the salon physical address works as a unique identifier. If the salon already exists in the database, it means that the salon page already exists, and the user-hair stylist does not need to create a new salon page.

Figure 7C:
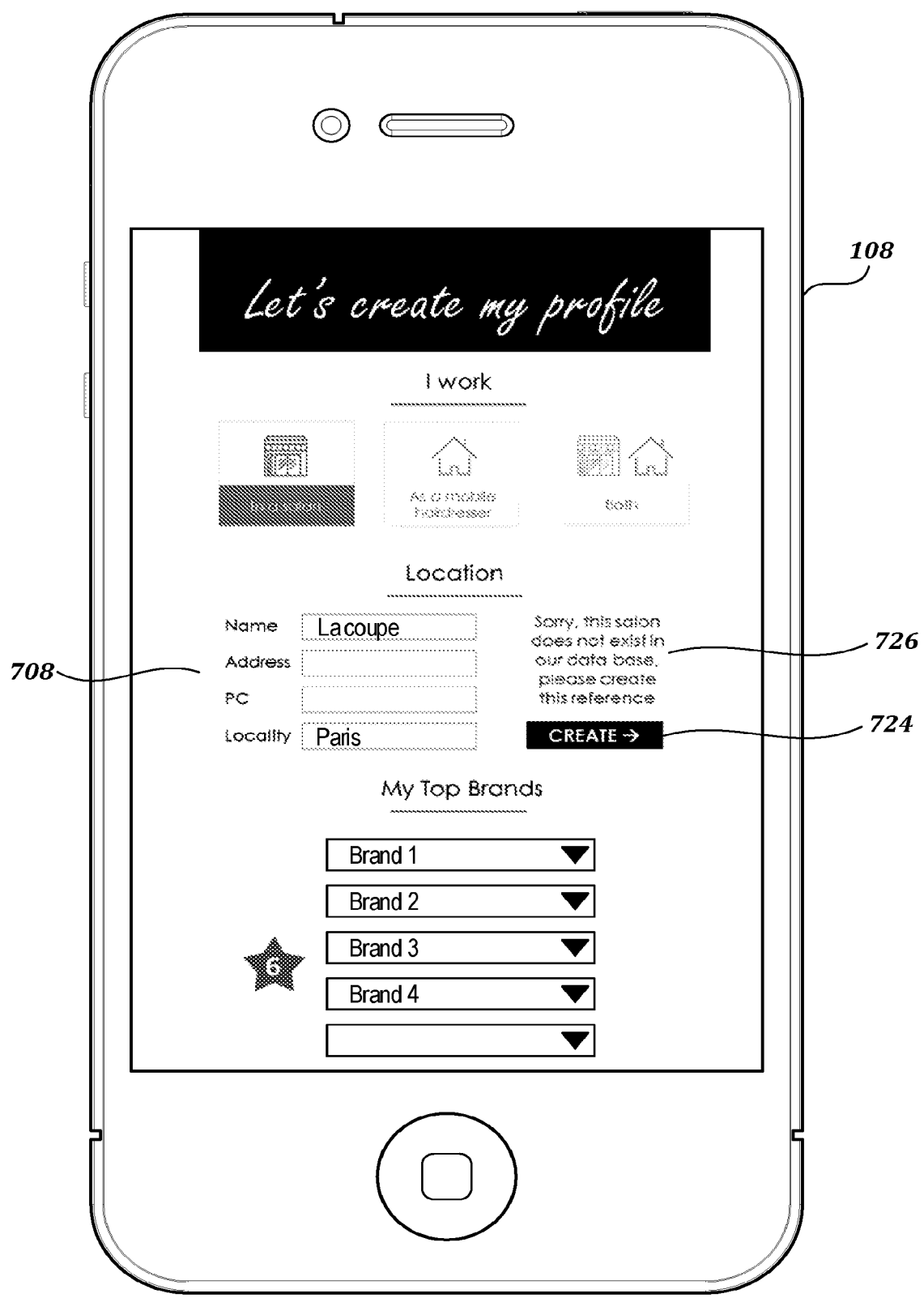
FIG. 7C is a block diagram that illustrates one embodiment of a graphical user interface (GUI) of a mobile device for performing an action of the method of FIG. 4.

If on the contrary, the physical address does not match with any salon already stored in the salon database, the user-hair stylist may be presented with a GUI screen on the mobile device 108 as illustrated in FIG. 7C. In FIG. 7C, an error message 726 warns the user-hair stylist that the salon does not exist in the database. Because the physical address is new to the salon database, the system can propose to create the salon page by displaying a "CREATE" button 724. Then, the user-hair stylist can click the CREATE button 724 to create the salon page in the salon database.

Figure 7D:
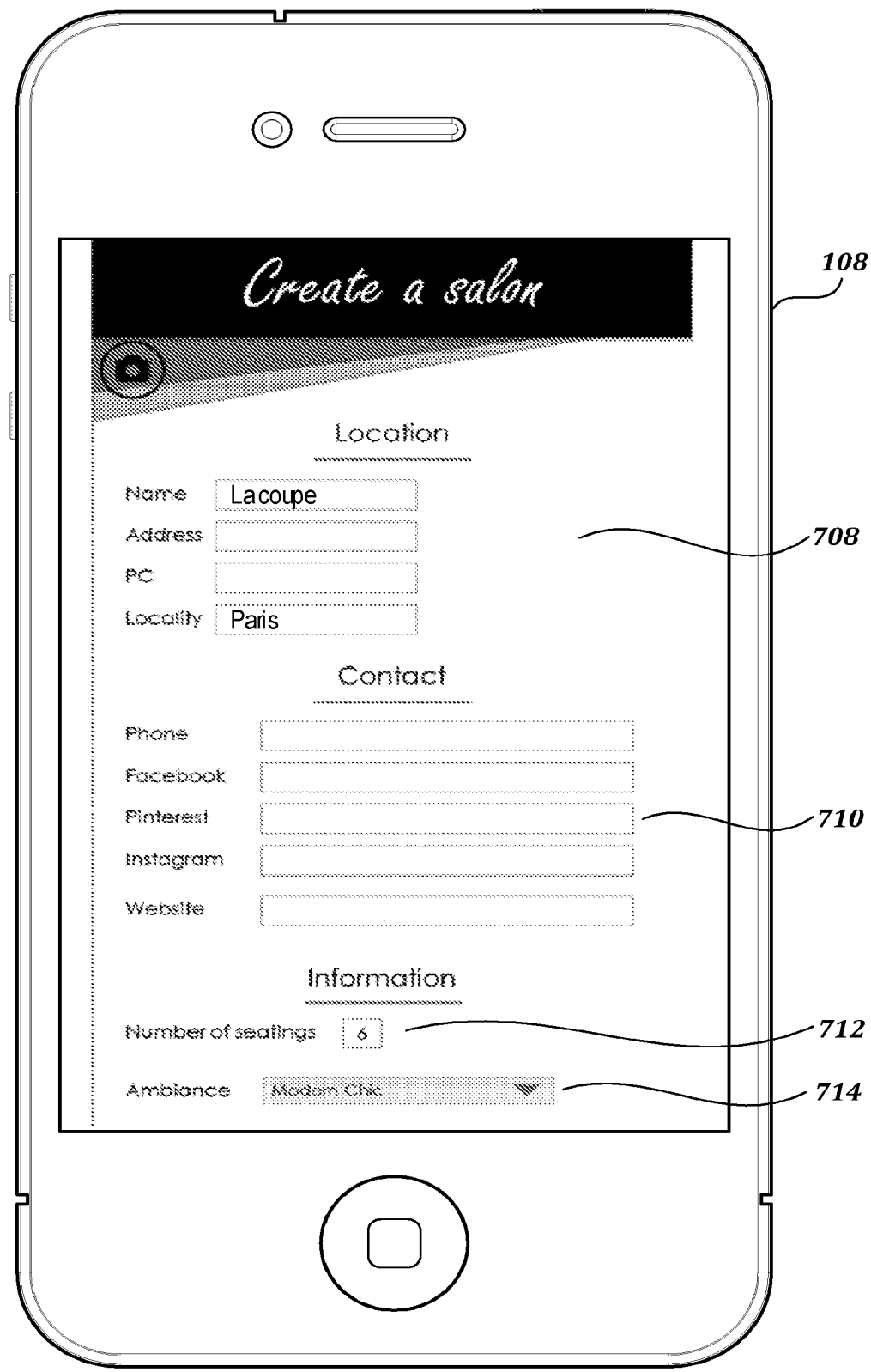
FIG. 7D is a block diagram that illustrates one embodiment of a graphical user interface (GUI) of a mobile device for performing an action of the method of FIG. 4.

FIG. 7D is one illustrative example of a GUI screen of a mobile device 108 for creating a salon page of the salon database. Field 708 is for displaying the salon location from the previous screen. Field 710 includes one or more modes of contact, including, for example, phone, website, and social media accounts. Field 712 is for selecting a discrete value of the number of seatings available at the salon. Field 714 is for selecting the categorical value of the ambiance of the salon from a drop-down menu, for example.

Figure 7E:
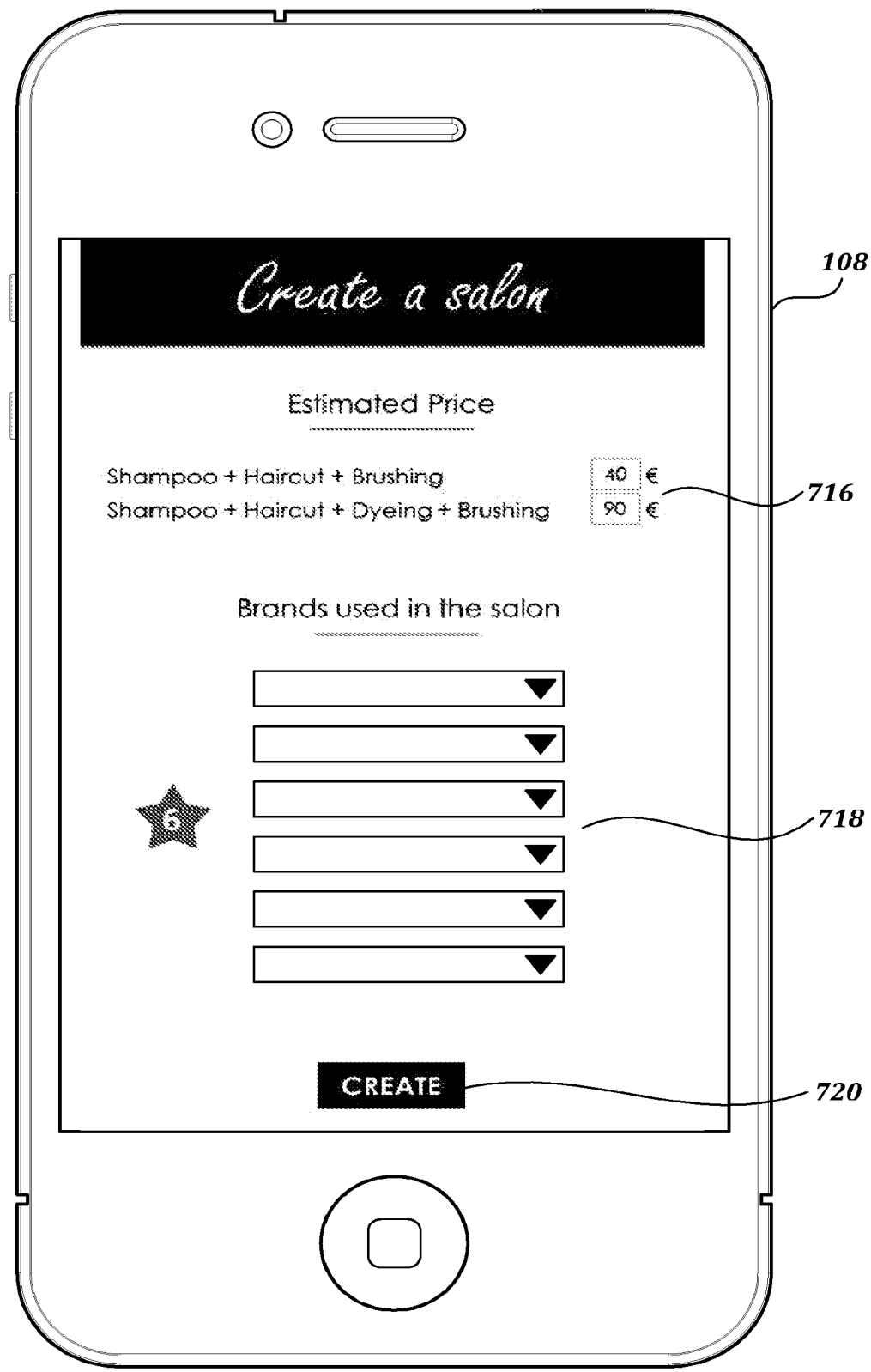
FIG. 7E is a block diagram that illustrates one embodiment of a graphical user interface (GUI) of a mobile device for performing an action of the method of FIG. 4.

When all the fields on the screen of FIG. 7D are completed, a new screen as shown in FIG. 7E may appear to complete the salon page. Field 716 can be used to provide the discrete values of prices for each services or for combination of services, which may be discounted if services are bundled into packages. Field 718 is for selecting the categorical value of product brands used in the salon. When the user-hair stylist is satisfied with the selections, the user-hair stylist selects the "CREATE" button 720 to create the salon page. If there are errors or missing data, a screen can appear specifying the errors.

Figure 7F:
FIG. 7F is a block diagram that illustrates one embodiment of a graphical user interface (GUI) of a mobile device for performing an action of the method of FIG. 4.

When the salon page is created, the user-hair stylist is moved back to his profile edition screen as illustrated in FIG. 7F.

Figure 7G:
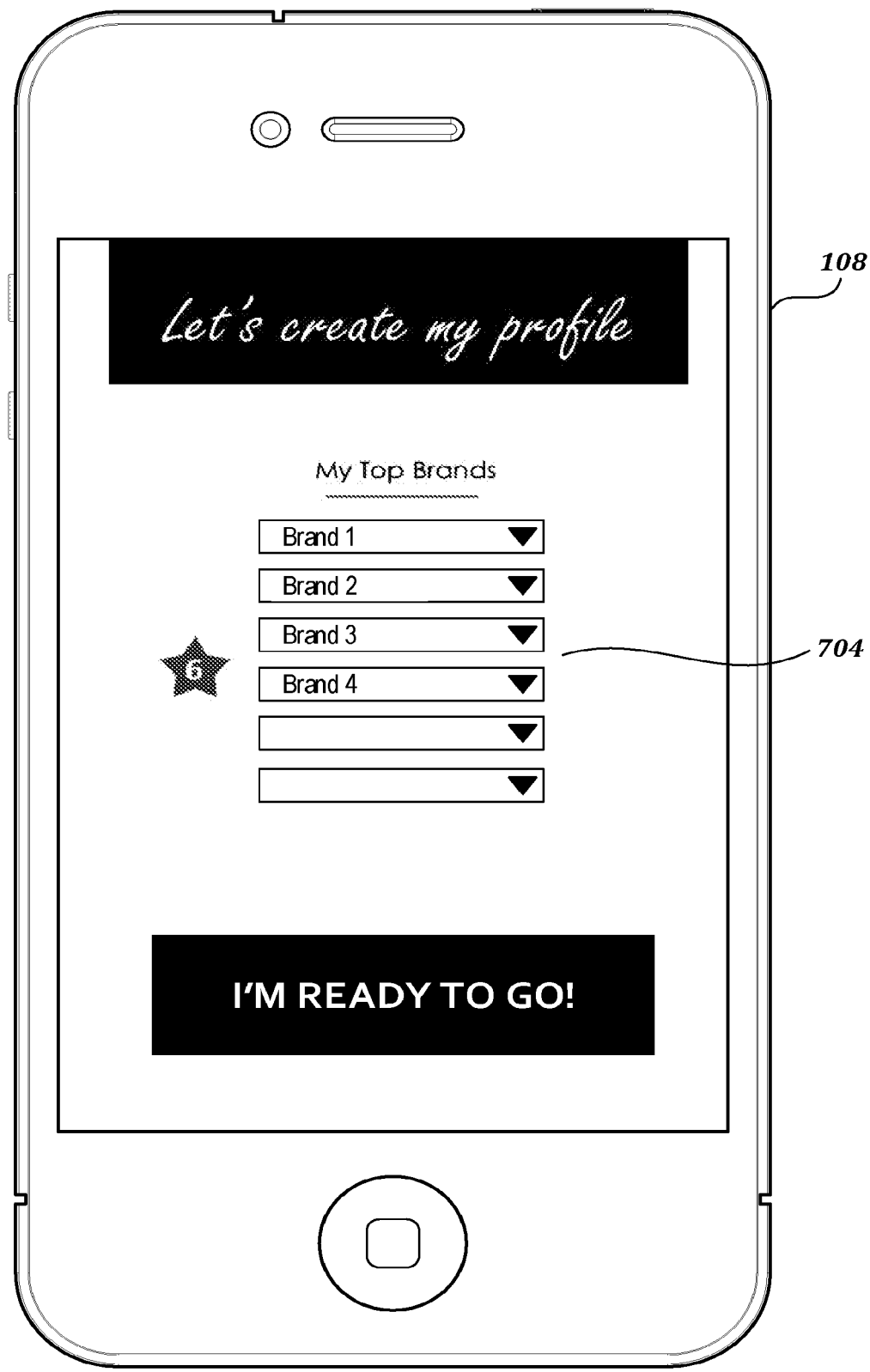
FIG. 7G is a block diagram that illustrates one embodiment of a graphical user interface (GUI) of a mobile device for performing an action of the method of FIG. 4.

The last step of the user-hair stylist profile creation is to list the brands he/she likes the most as a hair-stylist from a GUI screen as illustrated in FIG. 7G, where the favorite product brands can be selected from drop down menus in field 704.

Figure 7H:
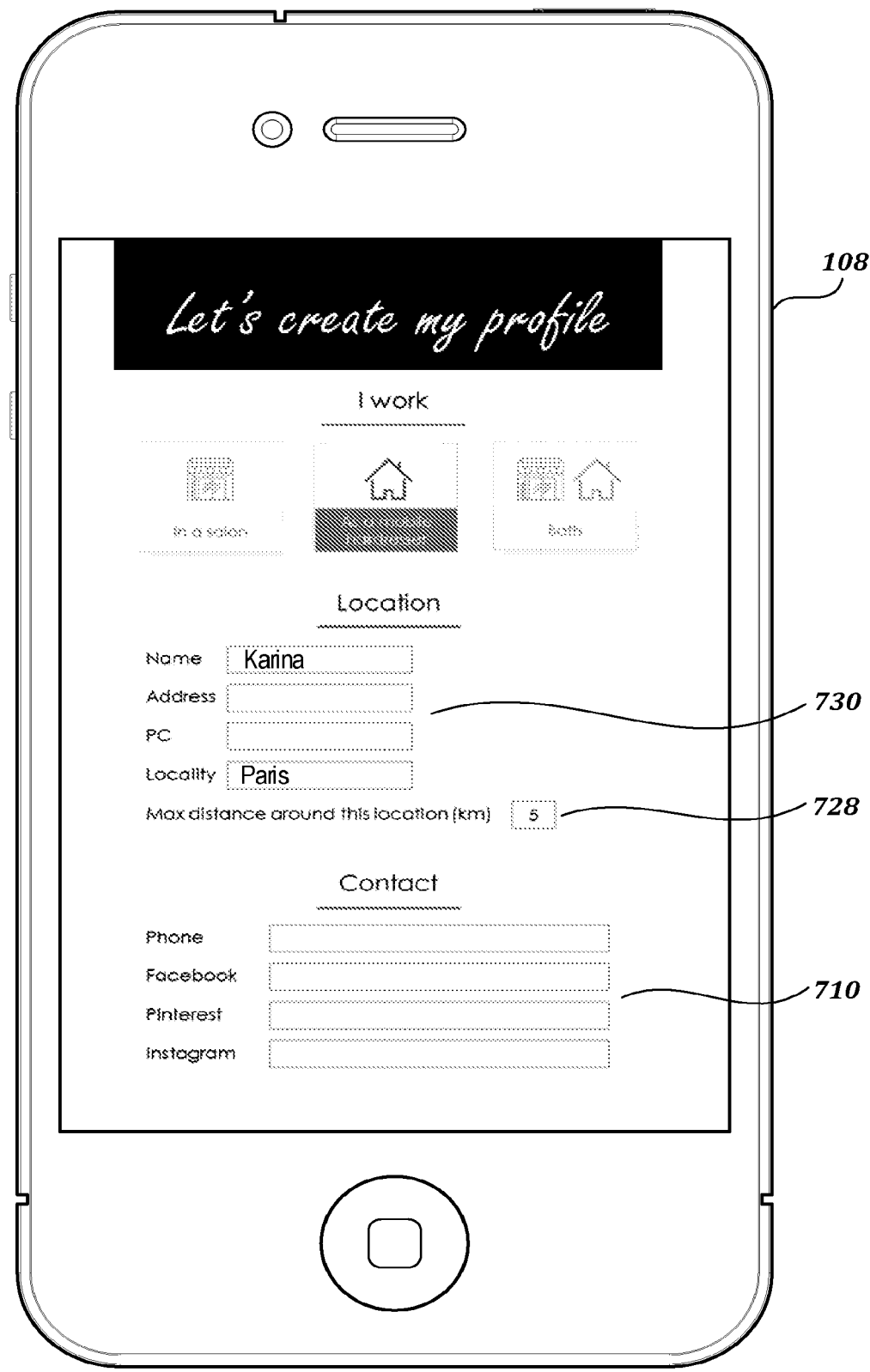
FIG. 7H is a block diagram that illustrates one embodiment of a graphical user interface (GUI) of a mobile device for performing an action of the method of FIG. 4.

The other possibility if the user-hair stylist works as a mobile hairdresser is to indicate the maximum travelling distance in a screen as illustrated in FIG. 7H. In the GUI screen of FIG. 7H, the field 728 allows the mobile user-hair stylist to enter the maximum traveling distance. The user-hair stylist may also enter contact information in field 730. In one embodiment, the user profile can be created by links to the existing user generated content to avoid a copy/paste of already existing information. To do so, the user hair stylist can indicate in field 710 the url addresses of their existing social media and websites.

FIGS. 6, 7A, 7B, 7C, 7D, 7E, 7F, 7G, and 7H are merely illustrative GUI screens for creating a profile, other categorical or discrete values can be added or deleted from the profile. Furthermore, payment systems can be set up by the user-hair stylist for online payment.

Referring back to FIG. 7A, when the user-hair stylist has finished building the profile, the user-hair stylist can review the selections, and the user-hair stylist can click on the "GO" button 706 to create the profile.

The selections for a user-customer by selecting button 502 in FIG. 5 can include building/editing profile, making a request, and displaying previous matches. However, if the user-customer selects requesting a hair stylist, and if the user-customer has not previously built a profile, an error screen can be displayed. The user-customer is then prompted to build a user-customer profile.

Figure 8:
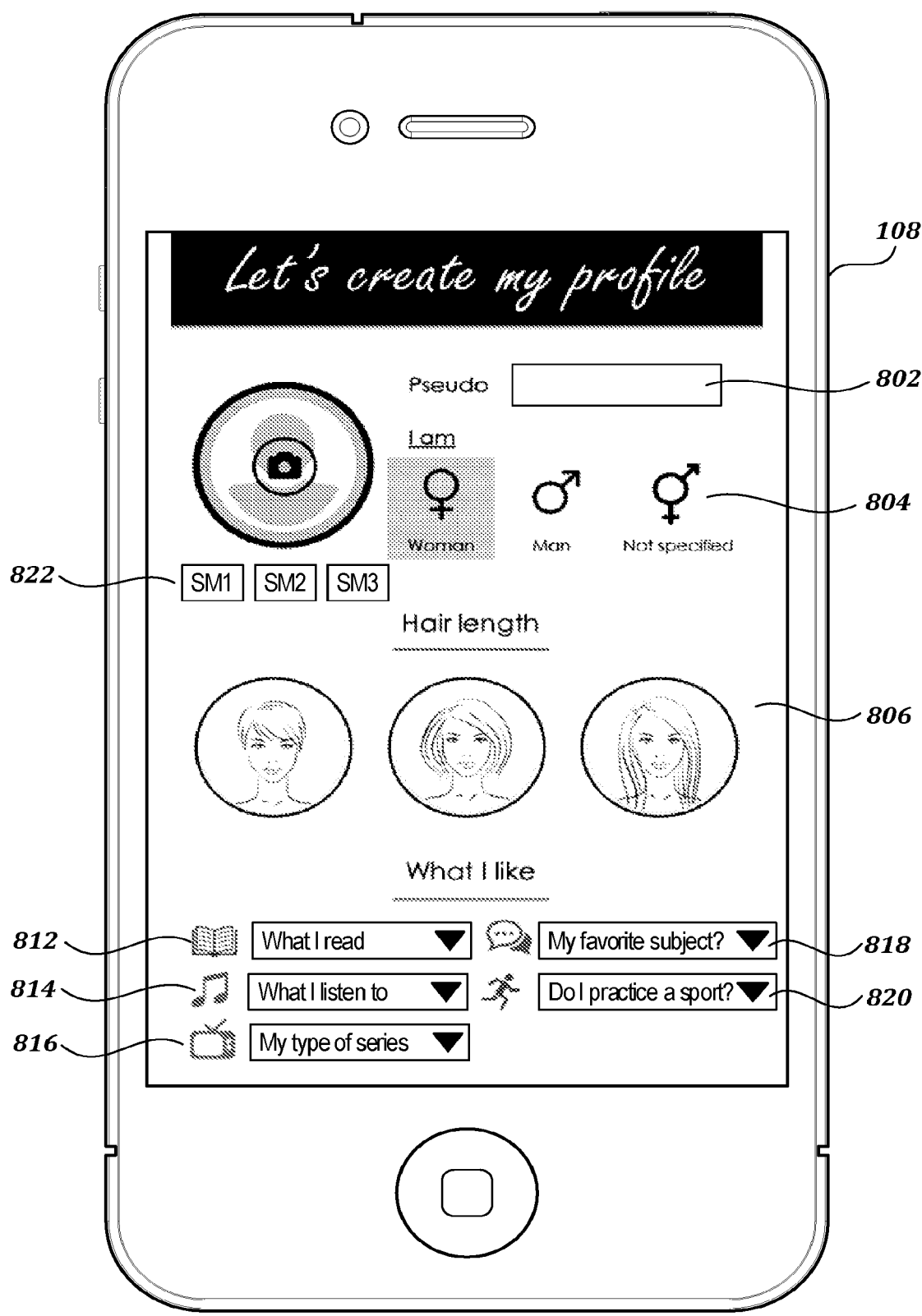
FIG. 8 is a block diagram that illustrates one embodiment of a graphical user interface (GUI) of a mobile device for performing an action of the method of FIG. 4.

FIG. 8 is one illustrative example of a GUI screen of a mobile device 108 for creating a user-customer profile. Input text block 802 allows the entry of alphanumeric characters to designate a user name for identification purposes. Input field 804 includes three buttons that allows the user-customer to identify the categorical value of the user-customer gender. Input field 806 includes three buttons that allows the user-customer to identify the categorical ordinal value of hair length from short, medium, or long. Alternatively, a slider button can be used to indicate the length of hair. Input field 812 is a drop down menu for selecting the categorical value of book genres from which the customer can select a favorite or not specify a favorite. Input field 812 is a descriptor for personality. Input field 814 is a drop down menu for selecting the categorical value of music genres from which the customer can select a favorite or not specify a favorite. Input field 814 is a descriptor for personality. Input field 816 is a drop down menu for selecting the categorical value of TV series genres from which the customer can select a favorite or not specify a favorite. Input field 816 is a descriptor for personality. Input field 818 is a drop down menu for selecting the categorical value of conversation topics from which the customer can select a favorite or not specify a favorite. Input field 818 is a descriptor for personality. Input field 820 is a drop down menu for selecting the categorical value of sport participation from which the customer can select a favorite or not specify a favorite. Input field 820 is a descriptor for personality.

Social media buttons 822 can be used to link to the user-customer's social media accounts. When selected, the one or more of the social media accounts are analyzed for user-generated content, such as images and text, for example, to automatically capture discrete and categorical values, such as personality traits, through AI machine learning routines or through image analysis or both.

Figure 9:
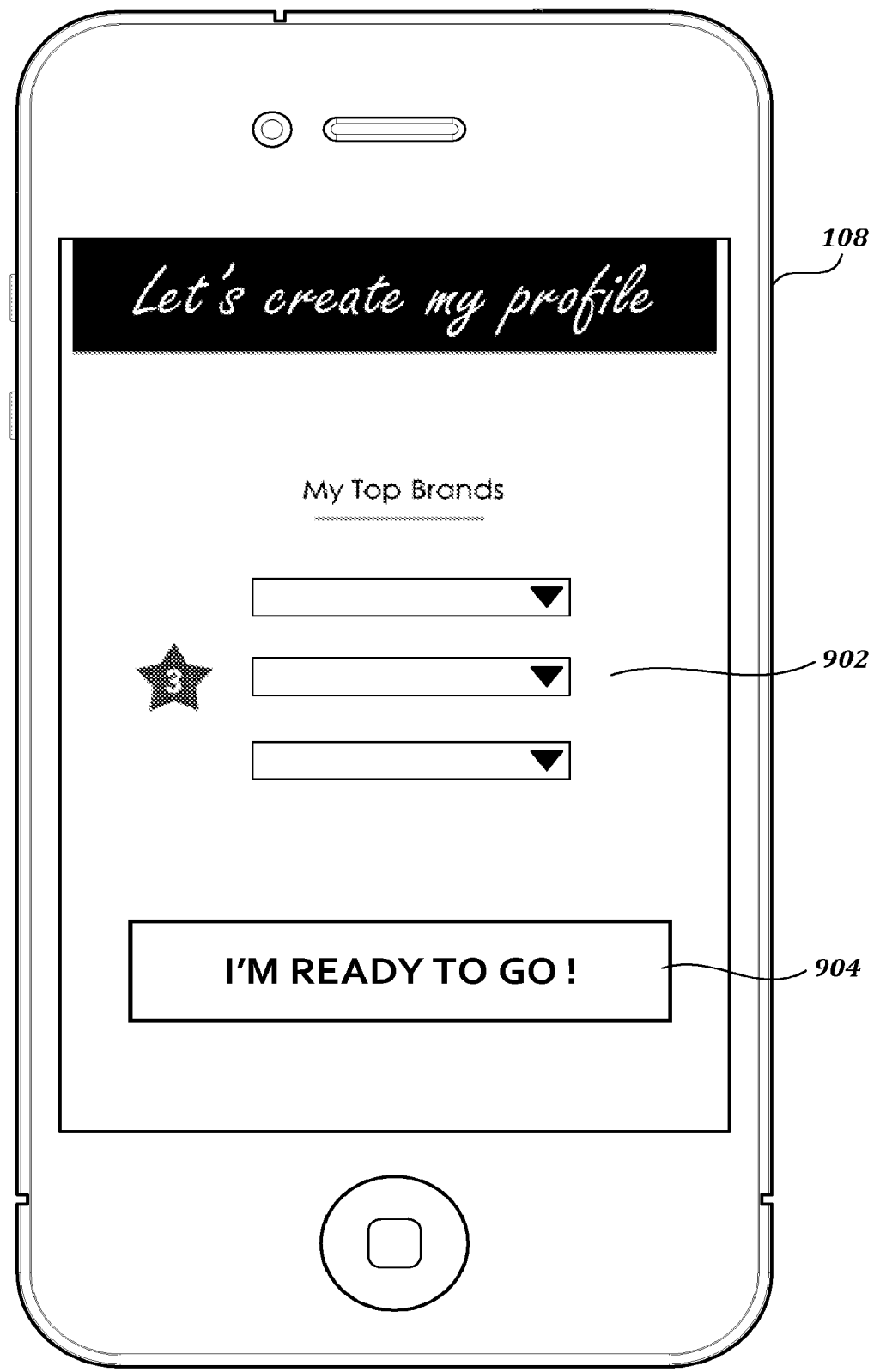
FIG. 9 is a block diagram that illustrates one embodiment of a graphical user interface (GUI) of a mobile device for performing an action of the method of FIG. 4.

FIG. 9 is one illustrative example of a GUI screen of a mobile device 108 for creating a user-customer profile. Input field 902 can contain any number, three, for example, of drop-down menus for identifying the categorical values of the user-customer's favorite product brands.

FIGS. 8 and 9 are merely illustrative, other categorical or discrete values can be added or deleted from the profile. Furthermore, payment systems, including bank or credit card transfers can be set up by the user-customer.

When the user-customer has finished building the profile, the user-customer can review the profile, and the user-customer can click on the "GO" button 904 to create the user-customer profile.

Referring to FIG. 4, after completion of profile building by user-customers and user-hair stylists in block 404, the method 400 enters block 406 from block 404. In block 406, the method 400 saves the profiles in the data store 130 of the matching server 116 (FIG. 3). From block 406, the method 400 enters block 408 or block 409. The decision whether to enter block 408 or 409 depends on whether the user has registered as a user-customer (button 502, FIG. 5A) who wants to request a user-hair stylist recommendation (button 520, FIG. 5C), or whether the user has identified himself as a user-hair stylist (button 504, FIG. 5A) who wants to request a job search (button 514, FIG. 5B) from other user-hair stylists.

In block 408, the user-customer can now make a request to find a hair stylist by inputting categorical and discrete values. The request is made by clicking the button 520 (FIG. 5C).

Figure 10:
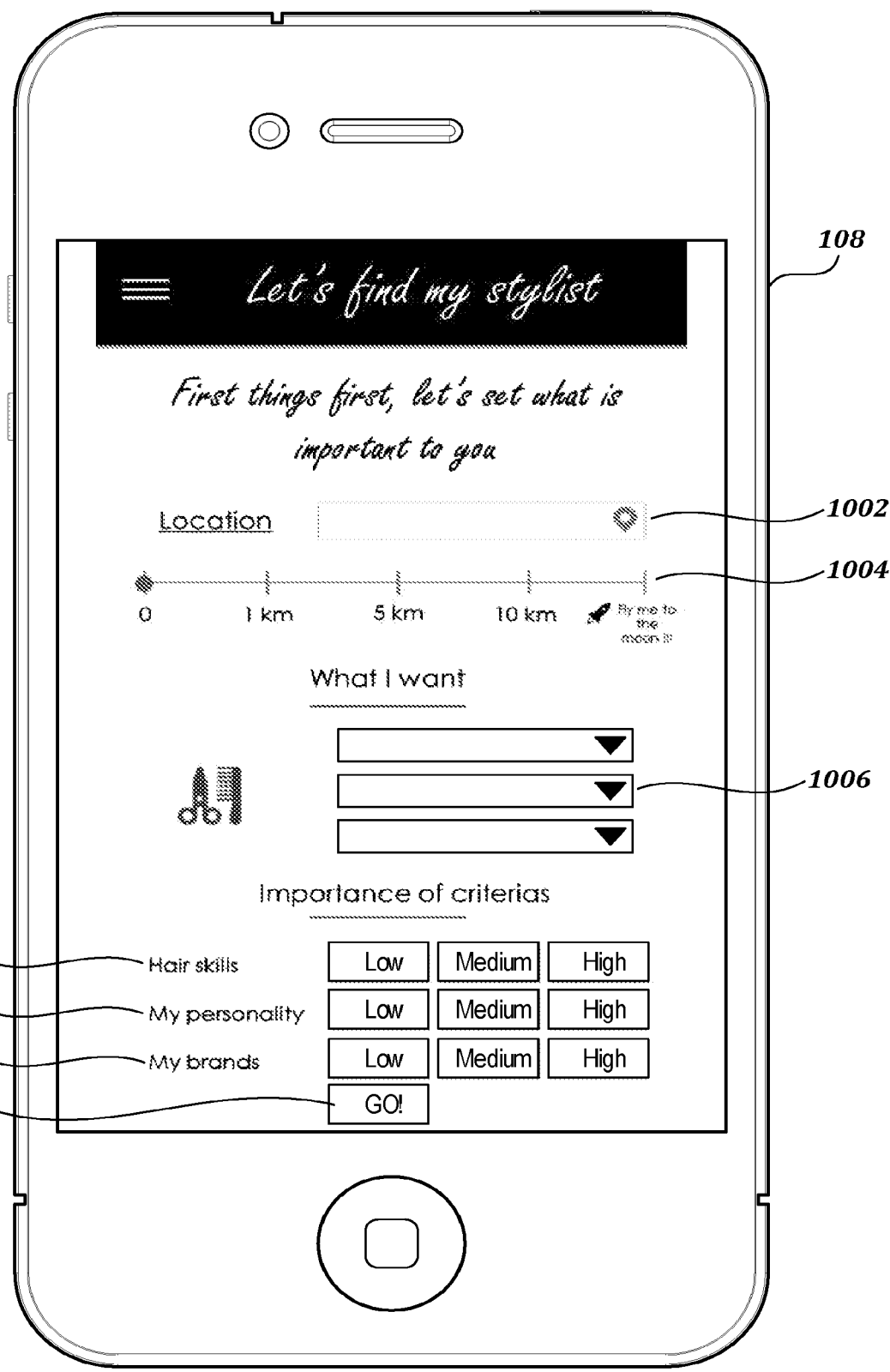
FIG. 10 is a block diagram that illustrates one embodiment of a graphical user interface (GUI) of a mobile device for performing an action of the method of FIG. 4.

FIG. 10 is one illustrative example of a GUI screen of a mobile device 108 for creating a request to find a hair stylist. The request build engine 134 (FIG. 3) can generate the screens for inputting the categorical and discrete values for making a request to find a hair stylist. Input text block 1002 allows the entry of alphanumeric characters to designate a user-customer location. Alternatively, the user-customer location can be determined by the global positioning system 120 of the mobile device 108. Some locations may be saved, such as "home" or "work" to avoid typing the location every time. If the user-customer does not wish to specify a location, for privacy reasons, the user-customer may specify street intersections, neighborhoods, landmarks, and the like. Input field 1004 is for inputting the discrete value of maximum distance the user-customer is willing to travel to a hair stylist salon. If the user-customer selects zero distance, this may exclude salons and only mobile hair stylists are considered for matching. Input field 1006 can contain any number, three, for example, of drop-down menus for identifying the categorical values of the user-customer's hair styling service needed. Input field 1008 is for inputting the categorical ordinal value of the subjective importance to the user-customer of matching the user-customer's hair styling services needed to the hair stylist's hair styling skills. Input field 1008 can include any number, three, for example, of buttons to select a value of low, medium, or high importance. Alternatively, a slider button can be used to indicate the importance. Input field 1010 is for inputting the categorical ordinal value of the subjective importance to the user-customer of matching the user-customer's personality categorical values to the hair stylist's personality categorical values. Input field 1010 can include any number, three, for example, of buttons to select a value of low, medium, or high importance. Alternatively, a slider button can be used to indicate the importance. Input field 1012 is for inputting the categorical ordinal value of the subjective importance to the user-customer of matching the user-customer's favorite product brands to the hair stylist's favorite product brands. Input field 1012 can include any number, three, for example, buttons to select a value of low, medium, or high importance. Alternatively, a slider button can be used to indicate the importance.

FIG. 10 is merely illustrative, other categorical or discrete values can be added or deleted from the request. For example, the user-customer can specify categorical values of salon ambiance or price ranges or requiring a saloon to be on a metro (bus, subway, train) route, and also assign an ordinal value from low, medium or high importance.

After the user-customer has completed the request on the mobile device 108, the user-customer can click on a "GO" button 1014.

Referring to FIG. 4, after completion of the request in block 408, and selecting the "GO" button 1014, the method 400 enters block 410.

In block 410, the request is transmitted to the matching server 116, where the matching engine 136 will match the requested categorical and discrete values in the request and user-customer profile to the categorical and discrete values from the profiles of the hair stylists in the data store 130. From block 410, the method enters block 412.

In block 412, the matching engine 136 can first apply a location filter to match the geolocation of the user-customer to the user-hair stylist. This filter applies the location of the user-customer in the request and the maximum distance willing to travel to the locations of salons within the radius of the maximum distance, or if the hair stylist is mobile, the matching engine 136 can also consider the maximum distance that the hair stylist is willing to travel. The matching engine 136 provides a filtered set of hair stylist meeting the geolocation request. From block 412, the method 400 enters block 414.

In block 414, the method 400 applies weighting formulas on the filtered set of hair stylists resulting from block 412. For example, the matching engine 136 will next select the categorical values rated highest in importance by the user-customer. The matching engine can set coefficients to apply a weighting algorithm to the categorical values as indicated in the request. A high importance, for example, can indicate that 75% to 100% of the hair stylist categorical values are included in the categorical values requested by the user-customer. However, not all categorical values can be weighted the same when they are designated at the same importance level. For example, high importance for matching the hair stylists whose hair styling skills include each of the hair styling services from input field 1006 requested by the user-customer can mean a 100% match. High importance for matching personality categorical values to hair stylists' personality categorical values can mean a 50% to 75% match. The matching engine subsequently applies weighting formulas to the medium importance categorical values, and last, the low importance categorical values. After each requested categorical value, the matching engine can filter out the user-hair stylists that do not meet the weighting criteria for importance. The matching engine 136 tabulates the final matches for hair stylists as percentages. From block 414, the method 400 enters block 416.

In block 416, any number, for example, three hair stylists having the highest matching percentages are presented to the user-customer. Additionally, the matching hair stylists results can be saved in block 426 in the data store 130 of the matching server 116 for display to the user-customer at the next time that the user-customer opens the application.

Figure 11A:
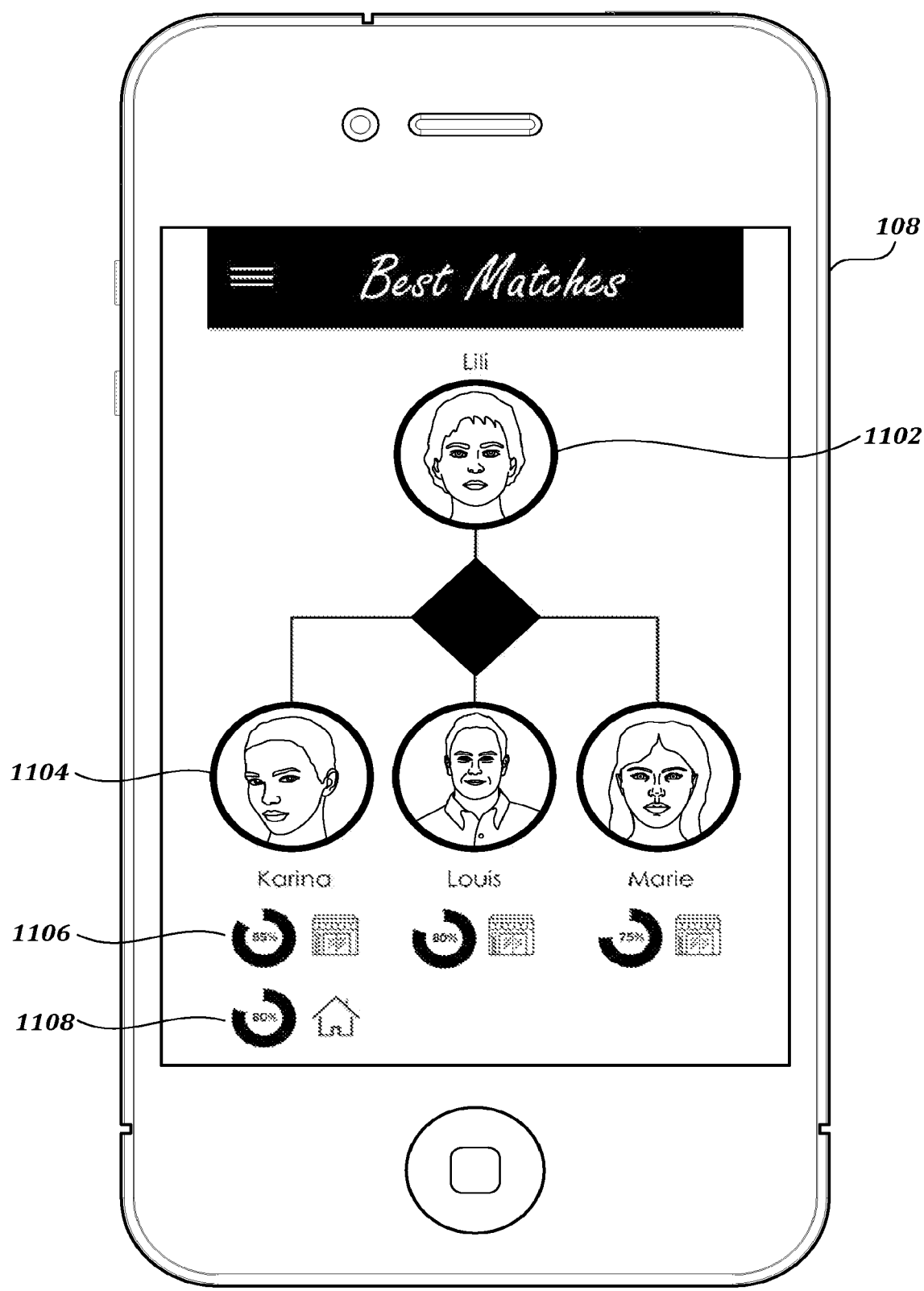
FIG. 11A is a block diagram that illustrates one embodiment of a graphical user interface (GUI) of a mobile device for performing an action of the method of FIG. 4.
Figure 11B:
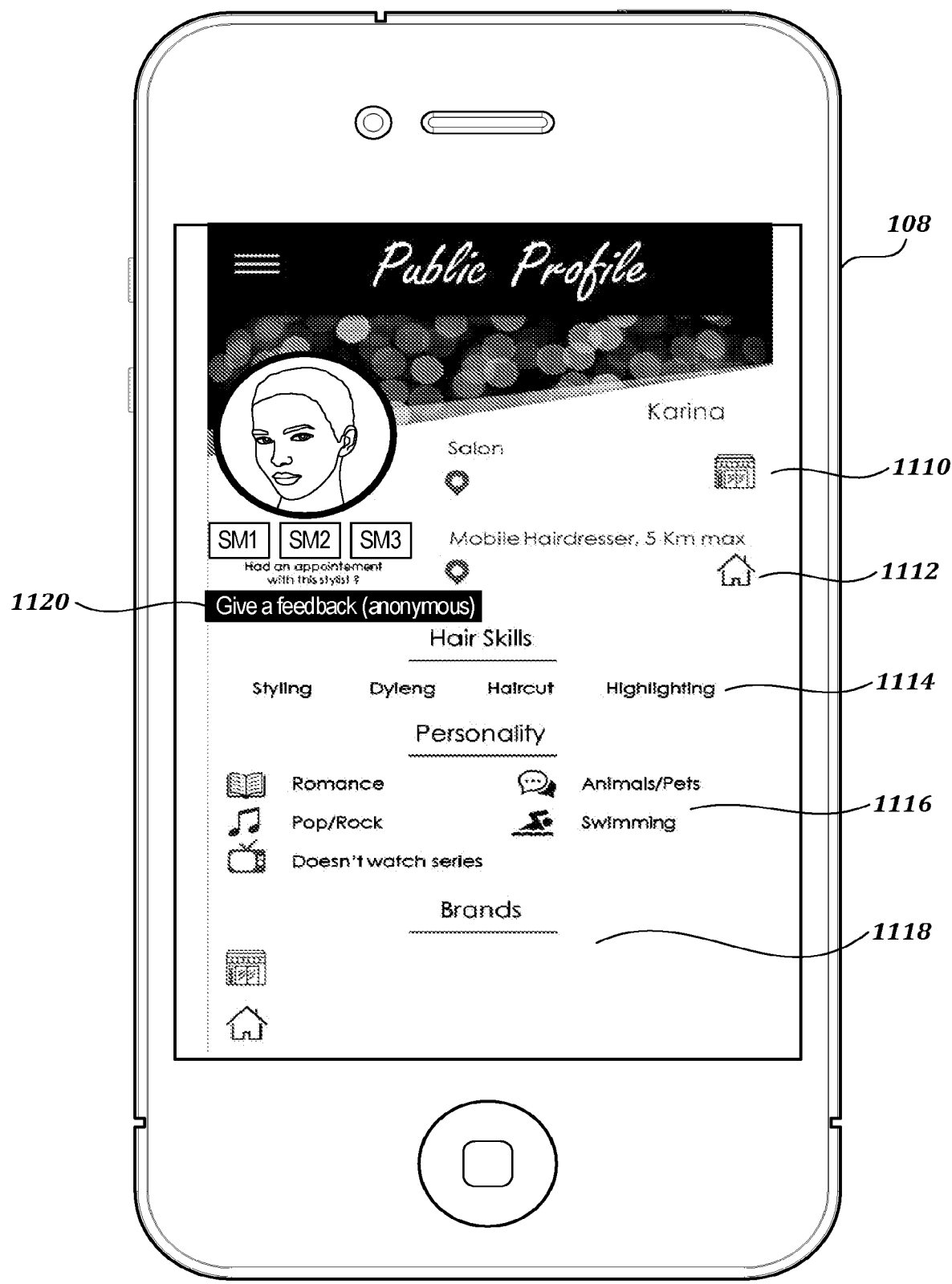
FIG. 11B is a block diagram that illustrates one embodiment of a graphical user interface (GUI) of a mobile device for performing an action of the method of FIG. 4.
Figure 11C:
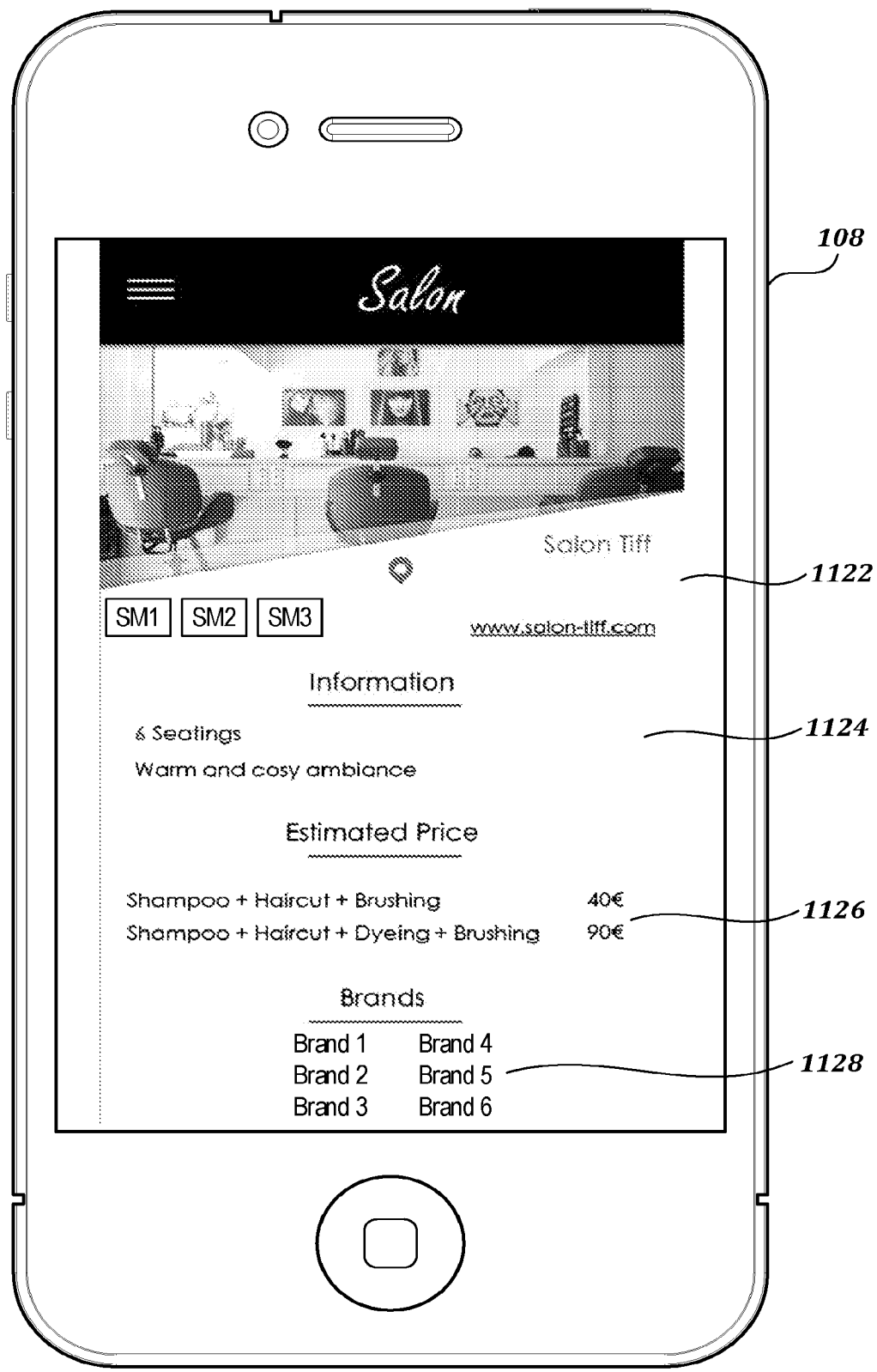
FIG. 11C is a block diagram that illustrates one embodiment of a graphical user interface (GUI) of a mobile device for performing an action of the method of FIG. 4.

FIG. 11A is one illustrative example of a GUI screen of a mobile device 108 for displaying the highest ranked hair stylists to a user-customer. Display field 1102 can identify the user-customer, such as by a picture or name. Display field 1104 can identify any number, three, for example, of the highest ranked hair stylists matching the request of the user-customer. Identification can be by picture or name or both. In one embodiment, clicking on the hair stylist's picture brings up a new GUI screen as shown in FIG. 11B. A result display field 1106 below the hair stylist identification field shows pictograms of the location type and the matching percent. In one embodiment, clicking on the salon pictogram brings up a new GUI screen as shown in FIG. 11C. A second results display field 1108 can show the matching percent of a second location type. Field 1120 is a button to select if the user-customer wishes to provide feedback on a hair stylist.

Referring to FIG. 4, from block 416, the method enters block 418. In block 418, the user-customer can consult any of the displayed highest ranked hair stylists to obtain their information. For example, by selecting one of the displayed hair stylists, one or more screens can appear on the mobile device 108 showing the profile of the hair stylist, including the type of location and address, distance, contact information and website, the hair stylist's hair styling skills, the personality categorical values in the hair stylist's profile, the hair stylist's favorite product brands, how many seatings in the salon, the estimated prices, the salon ambiance, and interior photos.

FIG. 11B is one illustrative example of a GUI screen of a mobile device 108 for reviewing the user-hair stylist's profile edited for public viewing. In field 1110, a pictogram of a salon is shown that if clicked on will bring up a new GUI screen as shown in FIG. 11C. Additionally or alternatively, a second pictogram is shown in field 1112 if the hair stylist has also indicated a mobile location. Clicking on the pictogram of a mobile location may bring up a new GUI screen having information about the mobile services, such as the distance the hair stylist is willing to travel to a user-customer's home. Field 1114 displays the hair stylist's hair styling skills offered. Field 1116 display's the hair stylist's personality categorical values, such as favorite book genre, favorite music, favorite television series, favorite discussion topic, and favorite sport participant. Field 1118 displays the product brands used in the salon and mobile locations.

FIG. 11C is one illustrative example of a GUI screen of a mobile device 108 for reviewing the hair stylist's salon page ("salon profile"). Field 1122 shows the salon details, such as contact information, social media, and a photograph of the salon interior. Field 1124 displays salon details, such as number of seatings and the salon ambiance, for example. Field 1126 shows the prices for services offered in general, or for the services requested by the user-customer in the request. Field 1128 is for displaying the product brands used in the salon.

Referring to FIG. 4, after the user-customer has been serviced by the user-hair stylist, the user-customer can provide feedback on whether the user-hair stylist's profile matches the hair styling experience. From block 418, the method 400 enters block 424. In block 424, the user-customer can provide feedback. Feedback can be provided via the mobile device 108 by gaining access to the user-hair stylist's public profile screen, as illustrated in FIG. 11B.

Figure 12:
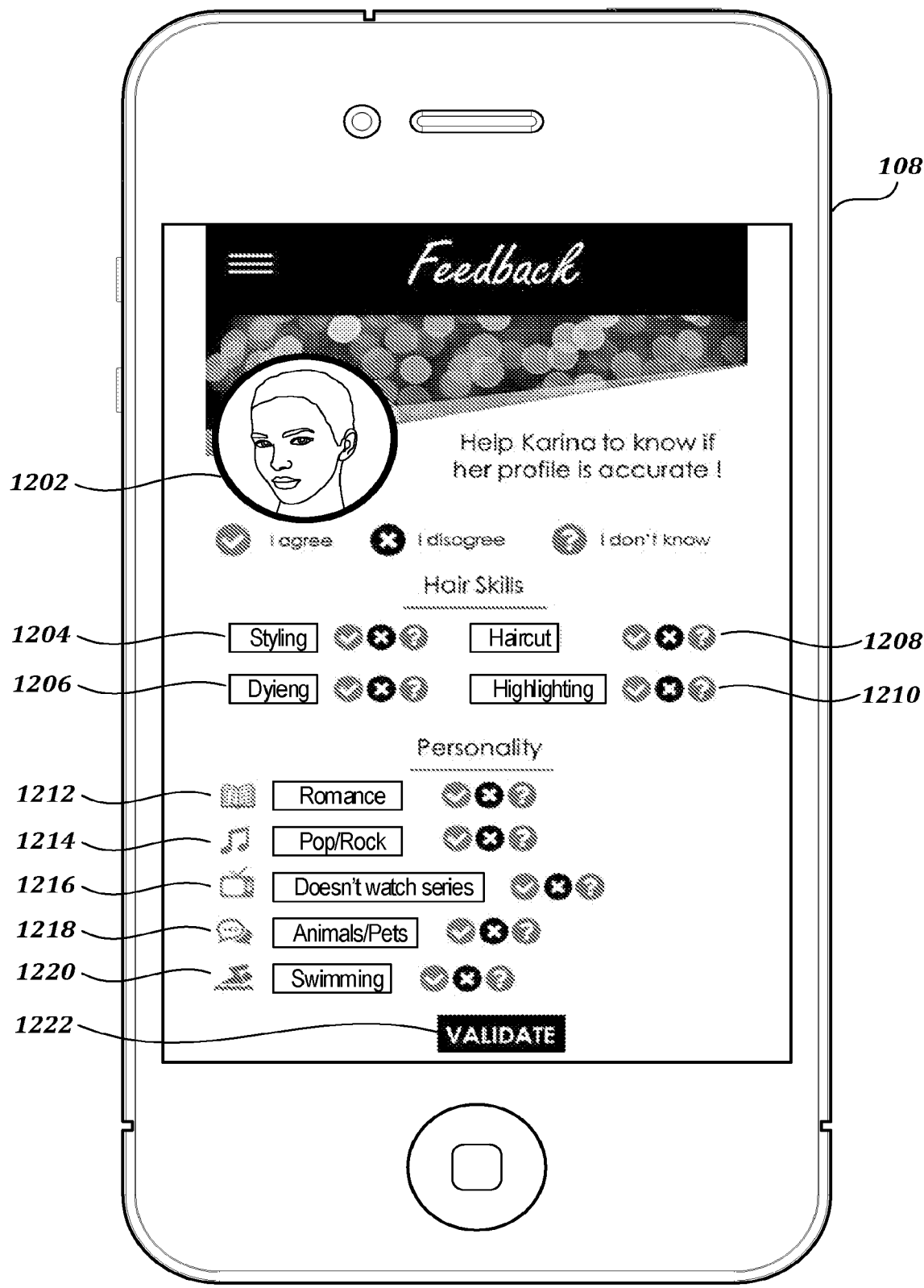
FIG. 12 is a block diagram that illustrates one embodiment of a graphical user interface (GUI) of a mobile device for performing an action of the method of FIG. 4.

FIG. 12 is one illustrative example of a GUI screen of a mobile device 108 for giving feedback to a user-hair stylist. The feedback engine 140 (FIG. 3) can generate the screens for inputting feedback, calculating the results, and displaying the feedback results. Identification field 1202 identifies the hair stylist by photo or name or both for which feedback is being provided. Input fields 1204, 1206, 1208, and 1210 are provided for each of the hair stylist's self-described hair styling skills with buttons that allow the user-customer to agree, disagree, or don't know to indicate whether the user-hair stylist possesses the self-described hair styling skills. Input fields 1212, 1214, 1216, 1218, 1220 are provided for each of the hair stylist's favorite personality categorical values with buttons that allow the user-customer to agree, disagree, or don't know to indicate whether the personality categorical values matched the personality of the hair stylist. When the user-customer is satisfied with the feedback provided, the user-customer can select the "VALIDATE" button 1222.

Referring to FIG. 4, after the user-customer has provided feedback on the user-hair stylist, the feedback engine 140 applies algorithms to recalculate the percentages that the user-hair stylist's personality and self-described skills categorical values match with the user-customers' feedback. From block 424, the method 400 enters block 428. In block 428, the user-hair stylist sees an anonymized averaged data of all feedbacks consolidation from user-customers. Referring to FIG. 5B, one option in the user-hair stylist's home screen is the option to view user-customers' feedback by clicking button 512.

Figure 13:
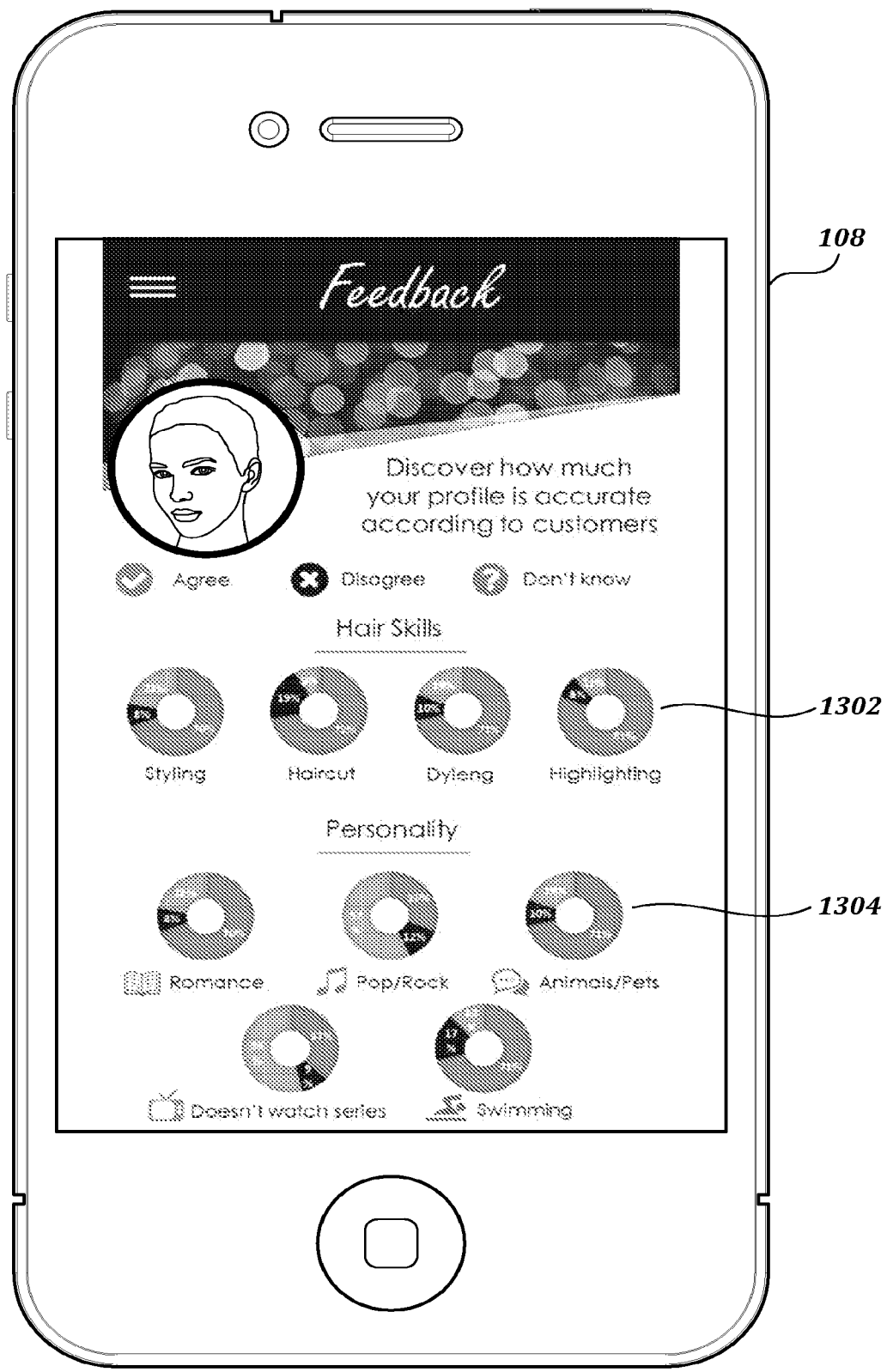
FIG. 13 is a block diagram that illustrates one embodiment of a graphical user interface (GUI) of a mobile device for performing an action of the method of FIG. 4.

FIG. 13 is one illustrative example of a GUI screen of a mobile device 108 for displaying feedback to the user-hair stylist. Results display field 1302 shows the percentage of user-customers that agree, disagree, and don't know for each of the hair stylist's hair styling skills that indicate whether, in the opinions of the user-customers, the hair stylist possesses such skills. Results display field 1304 shows the percentage of user-customers that agree, disagree, and don't know for each of the personality categorical values that indicate whether, in the opinions of the user-customers, the hair stylist personality matches the personality categorical values. When a user-hair stylist scores a low percentage of agrees, the hair stylist may consider editing the user-hair stylist profile.

FIGS. 6, 7A, 7B, 7C, 7D, 7E, 7F, 7G, 7F, 8, 9, 10 describe a way to load in the system discrete or categorical values directly selected or entered by the user in the interface. This description is non limiting as other data entry interface or technologies can be used, such as swiping gestures on touch screens for multiple choice, AI recognition of user generated content and the like.

Referring to FIG. 4, the user-hair stylist request for a job search begins in block 409. In block 409, the user-hair stylist can request to find a job in a salon by inputting categorical and discrete values relevant to the qualifications for a particular job.

The request build engine 134 (FIG. 3) can generate the screens for inputting the categorical and discrete values for making a request for a job search.

A job search request may use some of the same or different categorical and discrete values for matching a user-hair stylist searching for a job to another user-hair stylist or salon. For example, a user-hair stylist requesting a job search may input location, which alternatively, can be determined by the global positioning system 120 of the mobile device 108. A user-hair stylist requesting a job search may input the discrete value of maximum distance the user-hair stylist is willing to travel. A user-hair stylist requesting a job search may input the categorical values of the hair styling skills in which they are proficient, which can be ranked in order of proficiency. A user-hair stylist requesting a job search may input the categorical values that are descriptive of their personalities. A user-hair stylist requesting a job search may input the categorical value of their favorite product brands. A user-hair stylist requesting a job search may input a categorical ordinal value indicating the subjective importance to the user-hair stylist of matching the hair styling skills, personality, and product brands to the employer user-hair stylist.

Referring to FIG. 4, after completion of the job search request in block 409, the method 400 enters block 411.

In block 411, the job search request is transmitted to the matching server 116, where the matching engine 136 will match the requested categorical and discrete values in the job search request to employer user-hair stylists' profiles and salon pages. From block 411, the method enters block 413.

In block 413, the matching engine 136 can first apply a location filter to match the geolocation of the user-hair stylist. This filter applies the location of the user-hair stylist in the request and the maximum distance willing to travel to the job location. The matching engine 136 provides a filtered set of employer hair stylists or salons meeting the geolocation request. From block 413, the method 400 enters block 415.

In block 415, the method 400 applies weighting formulas on the filtered set of hair stylists and salons resulting from block 413. For example, the matching engine 136 will next select the categorical values rated highest in importance by the user-hair stylist. The matching engine can set coefficients to apply a weighting algorithm to the categorical values as indicated in the request. A high importance, for example, can indicate that 75% to 100% of categorical values match the categorical values in the job search request. However, not all categorical values can be weighted the same when they are designated at the same importance level. For example, high importance for matching the hair styling skills in the job search request can mean a 100% match. High importance for matching personality categorical values can mean a 50% to 75% match. The matching engine subsequently applies weighting formulas to the medium importance categorical values, and last, the low importance categorical values. After each requested categorical value, the matching engine can filter out the user-hair stylists and salons that do not meet the weighting criteria for importance. The matching engine 136 tabulates the final job search matches as percentages. From block 415, the method 400 enters block 417.

In block 417, any number, for example, six employer hair stylists or salons having the highest matching percentages are presented to the user-hair stylist. Additionally, the matching hair stylists results can be saved in block 427 in the data store 130 of the matching server 116 for display to the user-hair stylist at the next time that the user-hair stylist opens the application.

From block 417, the method enters block 419. In block 419, the user-hair stylist can consult any of the displayed highest ranked employer hair stylists or salons to obtain their information. For example, by selecting one of the displayed employer hair stylists or salons, one or more screens can appear on the mobile device 108 showing the public profile of the hair stylist or the salon page.

While FIG. 2 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 108 may be any one of any number of currently available or yet to be developed devices.

In its most basic configuration, the computing device 108 includes at least one processor 128 and a system memory 126 connected by a communication bus. Depending on the exact configuration and type of device, the system memory 126 may be volatile or nonvolatile memory, such as read only memory ("ROM"), random access memory ("RAM"), EEPROM, flash memory, or similar memory technology. Those of ordinary skill in the art and others will recognize that system memory 126 typically stores data and/or program modules that are immediately accessible to and/or currently being operated on by the processor 128. In this regard, the processor 128 may serve as a computational center of the computing device 108 by supporting the execution of instructions. As used herein, the term "computer-readable medium" includes volatile and non-volatile and removable and non-removable media implemented in any method or technology such as, but not limited to, a hard drive, solid state drive, CD ROM, DVD, or other disk storage, magnetic cassettes, magnetic tape, magnetic disk storage, and/or the like, capable of storing information, such as computer readable instructions, data structures, program modules, or other data. In this regard, the system memory 126 depicted in FIG. 2 is merely an example of computer-readable media.

As further illustrated in FIG. 2, the computing device 108 may include a network access 122 comprising one or more components for communicating with other devices over a network. Embodiments of the present disclosure may access basic services that utilize the network access 122 to perform communications using common network protocols. The network access 122 may also include a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network access 122 may represent one or more wireless interfaces or physical communication interfaces described and illustrated above with respect to particular components of the computing device 108.

Suitable implementations of computing devices that include a processor 128, system memory 126, and network access 122 are known and commercially available. For ease of illustration and because it is not important for an understanding of the claimed subject matter, FIG. 2 does not show some of the typical components of many computing devices. In this regard, the computing device 108 may include input devices, such as a keyboard, keypad, mouse, microphone, touch input device, touch screen, tablet, and/or the like. Such input devices may be coupled to the computing device 108 by wired or wireless connections including RF, infrared, serial, parallel, Bluetooth, Bluetooth low energy, USB, or other suitable connections protocols using wireless or physical connections. Similarly, the computing device 108 may also include output devices such as a display, speakers, printer, etc. Since these devices are well known in the art, they are not illustrated or described further herein. Representative embodiments are described.

In one embodiment, a method of ranking salon icons on a graphical user interface, the method comprising: analyzing a plurality of hair stylists' social media accounts for categorical values using text analysis by a text processor and image analysis by an image processor, wherein the analyzing determines an importance of each categorical value of each hair stylist; determining via the analyzing a geolocation of a salon associated with each of the plurality of hair stylists; analyzing one or more social media accounts of a user for categorical values using text analysis by a text processor and image analysis by an image processor, wherein the analyzing includes analyzing hashtags and assigning an importance to each analyzed categorical value of the user; determining a geolocation of the user using a global positioning system; receiving via a graphical user interface, a request to rank the hair stylists based on the analyzed categorical values of the hair stylist and the analyzed categorical values of the user; applying a first location filter to filter out the salons that are not within a predetermined distance from the geolocation of the user; applying a second filter to rank the salons by closeness of a match between the categorical values of the user to the categorical values of each hair stylist, wherein the categorical values of the user assigned higher importance are given more weight when ranking the salons; and displaying salon icons on a graphical user interface in order of descending closeness from highest to lowest ranking.

The method can further comprise creating a salon page having a plurality of discrete values and categorical values descriptive of a salon of the hair stylist.

The method can further comprise, wherein the categorical values of the user are selected from one or more of the group consisting of sex, hair length, favorite book genre, favorite music genre, favorite television series, favorite sport participant, favorite discussion topic, first favorite brand, second favorite brand, third favorite brand, or a combination thereof.

The method can further comprise, wherein the categorical values of the hair stylist are selected from one or more of the group consisting of sex of customer, favorite book genre, favorite music genre, favorite television series, favorite discussion topic, favorite sport participant, salon location, first hair styling skill, second hair styling skill, third hair styling skill, fourth hair styling skill, fifth hair styling skill, sixth hair styling skill, location type, first favorite brand, second favorite brand, third favorite brand, fourth favorite brand, fifth favorite brand, sixth favorite brand, or a combination thereof.

The method can further comprise creating a profile for each hair stylist and saving the profile in a data store.

The method can further comprise creating a profile for each user and saving the profile in a data store.

The method can further comprise creating a graphical user interface including a link to the profiles of hair stylists that have been previously matched.

The method can further comprise creating a graphical user interface that arranges favorite brands.

The method can further comprise creating a graphical user interface having a list of the categorical values and virtual button to select importance selected from high, medium, and low.

The method can further comprise creating a graphical user interface having virtual buttons for agreeing and disagreeing whether a categorical value of a hair stylist matches the categorical value of the user.

The method can further comprise creating a graphical user interface having icons displaying a percentage of users that agree and disagree whether a categorical value of a hair stylist matches the categorical value of the users.

In one embodiment, a computer-implemented method of matching a customer with a service provider, the method comprising: creating 404, by a computing device 108, a profile of a customer having a plurality of categorical values descriptive of or liked by the customer; creating 404, by the computing device, a profile of a service provider having a plurality of categorical values descriptive of or liked by the service provider; creating 408, by the computing device, a request by the customer to recommend a service provider, wherein the request includes one or more requested categorical and discrete values; and providing 416, by the computing device, ranked recommendations of service providers to the customer based on a comparison of the categorical values in the profiles of the customer and the service provider and the requested categorical and discrete values by the customer.

In one embodiment, the service provider is a hair stylist.

In one embodiment, the computer-implemented method further comprises, creating 404, by the computing device, a salon page having a plurality of discrete values and categorical values descriptive of a salon of the hair stylist.

In one embodiment, the recommendations are further based on determining location 412 coordinates of the customer via a global positioning system or a manual location entry and calculating the distance to a hair stylist is within the requested discrete value of maximum distance to travel by the customer.

In one embodiment, the categorical values in the profile of the customer are selected from one or more of the group consisting of sex, hair length, favorite book genre, favorite music genre, favorite television series, favorite sport participant, favorite discussion topic, first favorite brand, second favorite brand, third favorite brand, or a combination thereof.

In one embodiment, the customer has the option to not specify a categorical value.

In one embodiment, the categorical values of the customer are provided through a questionnaire, or are extracted from social media or user-generated content by means of artificial intelligence, or image analysis, or analysis of hashtags found on social media, or a combination.

In one embodiment, the categorical values of the hair stylist are provided through a questionnaire, or are extracted from social media or user-generated content by means of artificial intelligence, or image analysis, or analysis of hashtags found on social media, or a combination.

In one embodiment, the categorical values of the hair stylist are extracted from image analysis of the hair stylist's salon page.

In one embodiment, the categorical values in the profile of the hair stylist are selected from one or more of the group consisting of sex of customer, favorite book genre, favorite music genre, favorite television series, favorite discussion topic, favorite sport participant, salon location, first hair styling skill, second hair styling skill, third hair styling skill, fourth hair styling skill, fifth hair styling skill, sixth hair styling skill, location type, first favorite brand, second favorite brand, third favorite brand, fourth favorite brand, fifth favorite brand, sixth favorite brand, or a combination thereof.

In one embodiment, the hair stylist has the option to not specify a categorical value.

In one embodiment, the requested categorical values are selected from hair styling services and customer location, and the requested discrete values are selected from maximum distance to travel, importance of hair styling skill of the hair stylist, importance of customer profile, importance of customer favorite brands.

In one embodiment, the importance of the hair styling skill of the hair stylist, importance of customer profile, and importance of customer favorite brands are selected from values of low, medium, and high.

In one embodiment, the computer-implemented method further comprises providing feedback 424 by a customer ranking the hair styling skills of the hair stylist to the requested hair styling service and ranking one or more of the categorical values in the profile of the hair stylist.

In one embodiment, the recommendations are given as a percent representing a closeness of a match of the customer profile with the hair stylist profile and a match of the requested categorical and discrete values to the hair stylist profile.

In one embodiment, a computing device 108, comprising at least a memory 126 and processor 128, is configured to: create a profile of a customer having a plurality of categorical values descriptive of or liked by the customer; create a profile of a service provider having a plurality of categorical values descriptive of or liked by the service provider; create a request by the customer to recommend a service provider, wherein the request includes one or more requested categorical and discrete values; and provide ranked recommendations of service providers to the customer based on a comparison of the categorical values in the profiles of the customer and the service provider and the requested categorical and discrete values by the customer.

In one embodiment, the service provider is a hair stylist.

In one embodiment, the computing device is further configured to create a salon page having a plurality of discrete values and categorical values descriptive of a salon of the hair stylist.

In one embodiment, the recommendations are further based on determining location coordinates of the customer via a global positioning system or a manual location entry and calculating the distance to a hair stylist is within the requested discrete value of maximum distance to travel by the customer.

In one embodiment, the categorical values in the profile of the customer are selected from one or more of the group consisting of sex, hair length, favorite book genre, favorite music genre, favorite television series, favorite sport participant, favorite discussion topic, first favorite brand, second favorite brand, third favorite brand, or a combination thereof.

In one embodiment, the customer has the option to not specify a categorical value.

In one embodiment, the categorical values of the customer are provided through a questionnaire, or are extracted from social media or user-generated content by means of artificial intelligence, or image analysis, or analysis of hashtags found on social media, or a combination.

In one embodiment, the categorical values of the hair stylist are provided through a questionnaire, or are extracted from social media or user-generated content by means of artificial intelligence, or image analysis, or analysis of hashtags found on social media, or a combination.

In one embodiment, the categorical values of the hair stylist are extracted from image analysis of the hair stylist's salon page.

In one embodiment, the categorical values in the profile of the hair stylist are selected from one or more of the group consisting of sex of customer, favorite book genre, favorite music genre, favorite television series, favorite discussion topic, favorite sport participant, salon location, first hair styling skill, second hair styling skill, third hair styling skill, fourth hair styling skill, fifth hair styling skill, sixth hair styling skill, location type, first favorite brand, second favorite brand, third favorite brand, fourth favorite brand, fifth favorite brand, sixth favorite brand, or a combination thereof.

In one embodiment, wherein the hair stylist has the option to not specify a categorical value.

In one embodiment, the requested categorical values are selected from hair styling services and customer location, and the requested discrete values are selected from maximum distance to travel, importance of hair styling skill of the hair stylist, importance of customer profile, importance of customer favorite brands.

In one embodiment, the importance of the hair styling skill of the hair stylist, importance of customer profile, and importance of customer favorite brands are selected from values of low, medium, and high.

In one embodiment, the computing device is further configured to provide feedback by a customer ranking the hair styling skills of the hair stylist to the requested hair styling service and ranking one or more of the categorical values in the profile of the hair stylist.

In one embodiment, the recommendations are given as a percent representing a closeness of a match of the customer profile with the hair stylist profile and a match of the requested categorical and discrete values to the hair stylist profile.

In one embodiment, a system 116 comprises: a profile building engine 132 including computational circuitry configured to: create a profile of a customer having a plurality of categorical values descriptive of or liked by the customer and to create a profile of a service provider having a plurality of categorical values descriptive of or liked by the service provider; a request building engine 134 including computational circuitry configured to: create a request by the customer to recommend a service provider, wherein the request includes one or more requested categorical and discrete values; and a matching engine 136 including computational circuitry configured to: provide ranked recommendations of service providers to the customer based on a comparison of the categorical values in the profiles of the customer and the service provider and the requested categorical and discrete values by the customer.

In one embodiment, the service provider is a hair stylist.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of ranking salon icons through using graphical user interfaces, the method comprising:
   via a first graphical user interface, allowing selecting from a user or a hair stylist;
   upon selecting a hair stylist in the first graphical interface, via a second graphical user interface, allowing the hair stylist to select a profile;
   upon selecting a profile in the second graphical interface, via a third graphical user interface, allowing the hair stylist to input social media accounts, hair styling skills, and categorical values relating to personality;
   upon selecting a user in the first graphical user interface, via a fourth graphical user interface, allowing the user to select a profile;
   upon selecting a profile in the fourth graphical user interface, via a fifth graphical user interface, allowing the user to input social media accounts and categorical values relating to personality similar to the categorical values of the hair stylist;
   after creating multiple user profiles and multiple hair stylist profiles,
   upon selecting a user in the first graphical interface, via the fourth graphical user interface, allowing the user to a find a hair stylist;
   upon selecting find a hair stylist, via a sixth graphical user interface, allowing input of user location, hair styling service, importance of matching categorical values relating to personality, after completing the inputs in the sixth graphical user interface;

with one or more artificial intelligence routines, analyzing user-generated content of a plurality of hair stylists' social media accounts to capture the categorical values, including personality traits, using image analysis by an image processor;

determining via the analyzing a geolocation of a salon associated with each of the plurality of hair stylists;

with one or more artificial intelligence routines, analyzing user-generated content of one or more social media accounts of the user to automatically capture the categorical values, including personality traits, using image analysis by an image processor;

determining a geolocation of the user using a global positioning system;

ranking the hair stylists based on the analyzed categorical values of the hair stylist and the analyzed categorical values of the user;

applying a first location filter to filter out the salons that are not within a predetermined distance from the geolocation of the user;

applying a second filter to rank the salons by closeness of a match between the categorical values of the user to the categorical values of each hair stylist, wherein the categorical values of the user assigned higher importance are given more weight when ranking the salons; and displaying hair stylists and their salon icons on a seventh graphical user interface in order of descending closeness from highest to lowest ranking.

2. The method of claim 1, further comprising:

upon finishing the third graphical user interface, via a eighth graphical user interface, allowing creating a salon page having a plurality of discrete values and categorical values descriptive of a salon of the hair stylist.

3. The method of claim 1, wherein the categorical values of the user are selected from one or more of the group consisting of sex, hair length, favorite book genre, favorite music genre, favorite television series, favorite sport participant, favorite discussion topic, first favorite brand, second favorite brand, third favorite brand, or a combination thereof.

4. The method of claim 1, wherein the categorical values of the hair stylist are selected from one or more of the group consisting of sex of customer, favorite book genre, favorite music genre, favorite television series, favorite discussion topic, favorite sport participant, salon location, first hair styling skill, second hair styling skill, third hair styling skill, fourth hair styling skill, fifth hair styling skill, sixth hair styling skill, location type, first favorite brand, second favorite brand, third favorite brand, fourth favorite brand, fifth favorite brand, sixth favorite brand, or a combination thereof.

5. The method of claim 1, further comprising, in the fourth graphical user interface, including a link to the profiles of hair stylists that have been previously matched.

6. The method of claim 1, further comprising, upon finishing the third graphical user interface, via a ninth graphical user interface, allowing the hair stylist to arrange favorite brands.

7. The method of claim 1, further comprising, via the seventh graphical user interface, allowing selecting one of the displayed hair stylists, and via a tenth graphical user, allowing agreeing and disagreeing whether a categorical value of a hair stylist matches the categorical value of the user.

8. The method of claim 7, further comprising, after the tenth graphical user interface, via an eleventh graphical user interface, allowing a hair stylist to view a percentage of users that agree and disagree whether a categorical value of a hair stylist matches the categorical value of the users.

* * * * *